United States Patent [19]

Kuroda et al.

[11] 4,094,286

[45] June 13, 1978

[54] INTERNAL COMBUSTION ENGINE AND METHOD OF REDUCING TOXIC COMPOUNDS IN THE EXHAUST GASES THEREFROM

[75] Inventors: Hiroshi Kuroda, Tokyo; Yasuo Nakajima, Yokosuka; Yoshimasa Hayashi; Shin-ichi Nagumo, both of Yokohama, all of Japan

[73] Assignee: Nissan Motor Company, Ltd., Japan

[21] Appl. No.: 717,408

[22] Filed: Aug. 24, 1976

[30] Foreign Application Priority Data

Aug. 25, 1975 Japan .................... 50-103243
Aug. 25, 1975 Japan .................... 50-103244

[51] Int. Cl.² ............................. F02M 25/06
[52] U.S. Cl. .................. 123/119 A; 60/278; 60/274; 123/148 E; 123/191 R; 123/1 R
[58] Field of Search ........... 123/119 A, 148 E, 191 R, 123/1; 60/273, 274, 278

[56] References Cited

U.S. PATENT DOCUMENTS

| 2,257,631 | 9/1941 | Wahlberg | 123/52 M |
| 3,901,203 | 8/1975 | Pozniak | 123/119 A |
| 3,977,381 | 8/1976 | Fujikawa | 123/119 A |

OTHER PUBLICATIONS

Society of Automotive Engineers, Paper 720007, Jan. 10, 1972.
Society of Automotive Engineers, Paper 700081, Jan. 12, 1970.

*Primary Examiner*—Wendell E. Burns
*Attorney, Agent, or Firm*—Robert E. Burns; Emmanuel J. Lobato; Bruce L. Adams

[57] ABSTRACT

A multiple-cylinder spark-ignition internal combustion engine for an automotive vehicle, in which the ratio of the inactive compounds in the mixture gases produced in each combustion chamber to the fuel component in the combustible mixture inducted into the chamber is maintained within a predetermined range and the spark plug for each engine cylinder is arranged so that the flame travel from the spark plug is reduced to a minimum for promoting the combustion reaction to proceed in the least possible time. Improvements are further made in respect of the exhaust gas recirculation rate, the location and measurements of the spark plug, the configurations and measurements of the engine cylinder and the arrangement of the intake and exhaust ports so as to reduce the concentrations of toxic compounds in the exhaust gases without impairing the performance efficiency of the engine.

8 Claims, 19 Drawing Figures

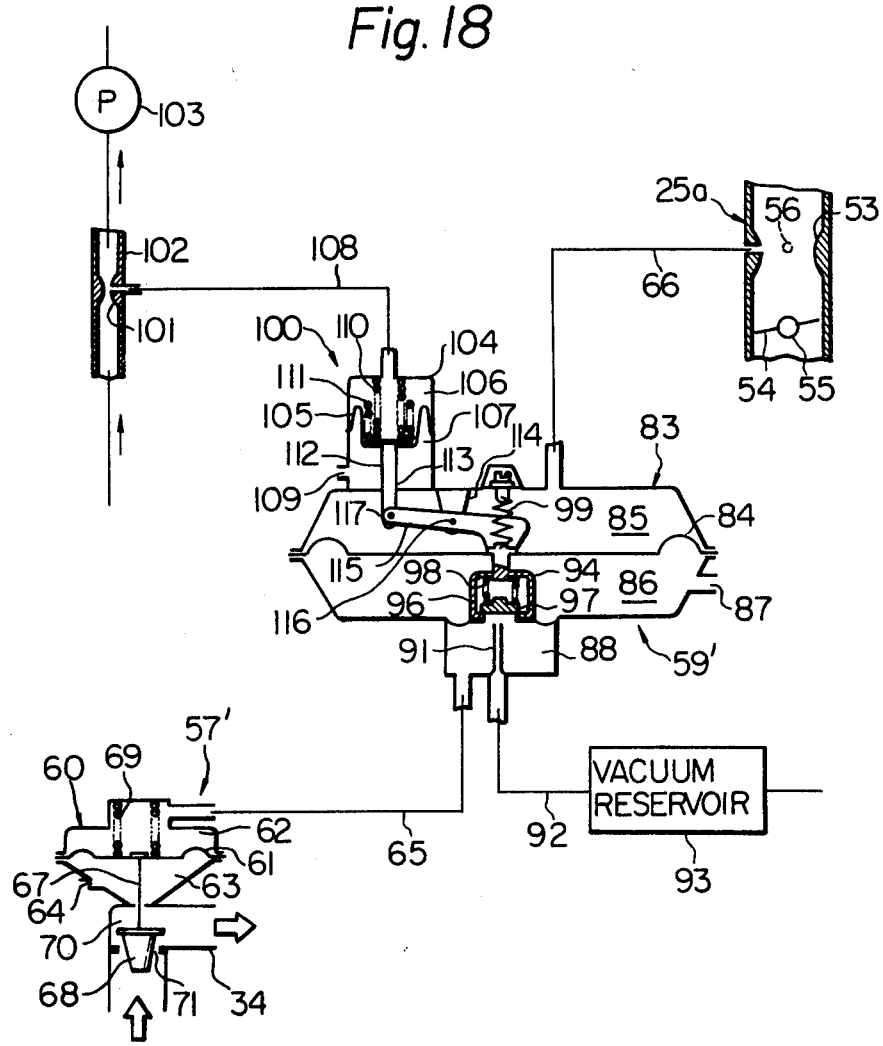

INTERNAL COMBUSTION ENGINE AND METHOD OF REDUCING TOXIC COMPOUNDS IN THE EXHAUST GASES THEREFROM

BACKGROUND OF THE INVENTION

The present invention relates in general to automotive engines and, particularly, to a multiple-cylinder reciprocating-piston spark-ignition internal combustion engine with exhaust gas cleaning arrangements. The present invention further relates to a method of reducing the concentrations of toxic compounds in exhaust gases of an internal combustion engine of the specific type.

A variety of attempts have thus far been made so as to reduce the concentrations of toxic compounds such as hydrocarbons (HC), carbon monoxide (CO) and nitrogen oxides ($NO_x$) in the exhaust gases emitted from automotive engines. The most basic and most important consideration to be paid in realizing such attempts on a practical basis is doubtlessly to preclude production of the toxic compounds in the process of combustion of air-fuel mixture in the combustion chambers of an engine. There have however been limitations in preventing production of toxic compounds by recourse to improvement in burning conditions of the air-fuel mixture in the combustion chambers of an engine. It has therefore been proposed and put into practice to have the exhaust systems of internal combustion engines equipped with after-burning devices such as thermal reactors and oxidative catalysts for the purpose of re-oxidizing unburned residues contained in the exhaust gases emitted from the combustion chambers of the engines. Such devices are thus successful in eliminating hydrocarbons and carbon monoxide in the exhaust gases but are not effective to process nitrogen oxides in the exhaust gases. Catalytic devices operative to reduce nitrogen oxides into harmless compounds are known but are not fully acceptable because of the lack of reliability, low cost-performance and insufficient durability of the catalysts used in such devices. Controlling the formation of nitrogen oxides in the combustion chambers of an internal combustion engine has therefore been decisive in cleaning up the exhaust gases from the engine. One of the useful expedients to preclude production of nitrogen oxides in the combustion chambers of an internal combustion engine is, as is well known in the art, to have the exhaust gases recirculated into the mixture supply system of the engine at a controlled rate so as to lower the maximum burning temperatures to be reached in the combustion chambers to such an extent as will reduce the concentration of nitrogen oxides to an acceptable level. In view of the fact that the recirculated exhaust gases per se are not contributive to the combustion of the fuel in the mixture, the concentration of nitrogen oxides produced in the combustion chambers of an engine must be reduced by increasing not only the proportion of the recirculated exhaust gases but the proportions of other chemical compounds not contributive to the combustion of the mixture in the combustion chambers to the fuel content of the mixture supplied to the engine cylinders. The compounds not contributing to the combustion of the mixture in the combustion chambers may include, in addition to the recirculated exhaust gases, carbon dioxide ($CO_2$) and water vapor ($H_2O$) contained in the residual exhaust gases which have failed to be discharged from the combustion chambers during the exhaust stroke of the preceding cycle of operation and thus remaining in the combustion chambers, and nitrogen ($N_2$) inherently contained in the air-fuel mixture supplied to the engine cylinders. If the mixture is leaned off for the purpose of reducing the concentrations of hydrocarbons and carbon monoxide, the gases not contributing to the combustion of the mixture will further include oxygen ($O_2$) contained in the excess air in the mixture. Such compounds not contributive to the combustion reaction in a combustion chamber will be hereinafter referred to as "inactive compounds" or "inactive gases" contained in the "mixture gases" produced in the combustion chamber and containing the air-fuel mixture inducted into the combustion chamber from a mixture supply system such as a carburetor of an internal combustion engine. Furthermore, the "leaned" air-fuel mixture as herein referred to means an air-fuel mixture which is leaner than a stoichiometric mixture and which is thus proportioned to have a theoretical air-to-fuel ratio of approximately 14.7:1 in the case of an air-gasoline mixture.

Increasing the proportion of the inactive compounds to the fuel content in the mixture gases produced in a combustion chamber is conducive to reduction of nitrogen oxides in the combustion chamber but results in a slower combustion that tends to reduce the thermal efficiency of the engine especially when the engine is operating at high speeds. This gives rise to deterioration of the efficiency at which the heat energy generated in the combustion chamber is converted into mechanical power output of the engine and to an increase in the fuel consumption rate and, for this reason, there has been a limit to which the quantities of nitrogen oxides can be reduced by admixing desired quantities of inactive gases to the air-fuel mixture inducted into the combustion chamber. Furthermore, the reduction of the maximum combustion temperature as invited by the recirculation of the exhaust gases into the engine cylinders is responsible for incomplete combustion of the air-fuel mixture and results in increases in the concentrations of hydrocarbons and carbon monoxide in the exhaust gases emitted from the combustion chambers of the engine. The present invention contemplates elimination of these problems encountered in an internal combustion engine arranged to reduce the concentration of nitrogen oxides in the exhaust gases by increasing the proportion of the total quantity of the inactive compounds in the mixture gases produced in engine cylinders to the quantity of the combustible charges in the mixture gases.

SUMMARY OF THE INVENTION

It is, accordingly, an important object of the present invention to provide a method of reducing the concentrations of toxic compounds in the exhaust gases of an internal combustion engine of the described character without sacrifice of the stability of operation and performance efficiency of the engine.

It is another important object of the present invention to provide a method of reducing the concentration of nitrogen oxides in the exhaust gases of an internal combustion engine of the described character by increasing the proportion of the inactive compounds in the mixture gases produced in the combustion chambers of the engine without impairing the stability of operation and performance efficiency of the engine.

It is still another important object of the present invention to provide a method of reducing the concentration of nitrogen oxides in the exhaust gases of an internal combustion engine of the described character by increasing the proportion of the inactive compounds in the mixture gases produced in the combustion chambers of the engine and by reducing the flame travel in the combustion chamber so as to complete the combustion reaction in the least possible time for thereby compensating for the reduced combustion rate resulting from the increased proportion of the inactive compounds in the mixture gases.

It is still another important object of the present invention to provide a method of reducing the concentrations of hydrocarbons and carbon monoxide in the exhaust gases of an internal combustion engine of the described character by maintaining the exhaust gases emitted from the engine cylinders at sufficiently high temperatures until the exhaust gases reach the exhaust re-combustion device provided in the exhaust system of the engine so that the unburned combustible residues contained in the exhaust gases can be completely afterburned or re-oxidized in the exhaust re-combustion device.

Yet, it is another important object of the present invention to provide a multiple-cylinder reciprocating-piston spark-ignition internal combustion engine adapted to put into practice the above-mentioned method according to the present invention at a low cost and without major alteration of the basic design concept of an ordinary internal combustion engine of the specified type.

In accordance with one important aspect of the present invention, there is provided an automotive multiple-cylinder reciprocating piston spark-ignition internal combustion engine which comprises, in combination, a multiple-cylinder spark-ignition internal combustion engine comprising exhaust-gas cleaning means in the exhaust system, mixture control means by which the ratio of the weight of inactive compounds in the mixture gases produced in the combustion chamber of each of the engine cylinders during each cycle of operation of the cylinder to the weight of the fuel component in the air-fuel mixture inducted into the combustion chamber is maintained within the range between about 13.5:1 and about 22.5:1, and an ignition system which includes s spark plug in the combustion chamber in each of the engine cylinders, the spark plug being arranged so that the volume of the space enclosed within a spherical envelope having a radius $r$ in the combustion chamber about the firing point of the spark plug occupies at least 35 percent of the clearance volume of the combustion chamber, wherein the radius $r$ is given, when measured in meters, by the relation $r = (\theta \cdot Vc)/(6N)$ where $\theta$ is the degree of spark advance in terms of crankshaft rotation angle before the top dead center, Vc is the combustion rate in meters per second of the combustible charge in the combustion chamber and N is the revolution speed in rpm of the engine within a predetermined range. The above-mentioned mixture control means may comprise exhaust gas recirculation system operative to recirculate the exhaust gases from the exhaust system into the intake manifold of the engine at a rate providing a recirculated exhaust gas ratio which is varied in accordance with such characteristics as are indicated by closed-loop isoplethic curves in terms of the revolution speed and load of the engine and which peaks up during normal steady-state operating conditions of the engine. The spark plug may be further arranged so that the firing point thereof is located at a distance within the range between about 2 millimeters and 7 millimeters from the internal surface of a wall portion in which the spark plug is mounted. Furthermore, the spark plug may have a sparking gap measuring within the range between about 1.1 millimeter and about 2.0 millimeters and/or a discharge area which is equal to about one fourth of the discharge area of a conventional spark plug. Each of the engine cylinders may be arranged to provide a squish region having an area of about 0.1 to about 0.45 times the cross sectional area of the cylinder bore. In this instance, the squish region preferably has a thickness of within the range between about 1.05 millimeter and about 2.5 millimeters. Each of the engine cylinder may be further arranged to have a bore diameter less than 95 millimeters and to provide a compression ratio within the range between about 8.0:1 and about 10.5:1. For the purpose of minimizing the reduction of the exhaust temperature, the engine cylinders are preferably so arranged as to provide siamesed port arrangement for the exhaust ports thereof. Such a purpose may be accomplished when each of the exhaust ports has at its inlet end a diameter of about 0.40 to 0.50 times the diameter of the cylinder bore or by provision of a heat-resistive lining in each of the exhaust ports.

In accordance with another important aspect of the present invention, there is provided a method of reducing the concentrations of toxic compounds in the exhaust gases emitted from a multiple-cylinder spark-ignition internal combustion engine including exhaust-gas recirculating means for partially recirculating the exhaust gases from the exhaust system into the intake manifold of the engine, exhaust-gas cleaning means in the exhaust system and an ignition system including, in the combustion chamber of each of the engine cylinders, a spark plug which is arranged so that the volume of the space enclosed within a spherical envelope having the above defined radius $r$ in the combustion chamber from the firing point of the spark plug occupies at least 35 percent of the clearance volume of the combustion chamber, comprising maintaining within the range between about 13.5:1 and about 22.5:1 the ratio of the weight of inactive compounds in the mixture gases produced in the combustion chamber of each of the engine cylinders during each cycle of operation of the cylinder to the weight of the fuel component in the air-fuel mixture inducted into the combustion chamber. The ratio may be maintained within the particular range by controlling one, two or all of the proportion of the residual gases in the combustion chamber during each cycle of operation of the cylinder, the air-to-fuel ratio or more particularly the proportion of excess air in the air-fuel mixture to be inducted into the cylinder, and the rate at which the exhaust gases are recirculated into the intake manifold of the engine. The method may further comprise controlling the exhaust gas recirculation rate for providing a recirculated gas ratio which is varied in accordance with such characteristics as are indicated by closed-loop isoplethic curves in terms of the revolution speed and load of the engine and which peaks up during normal steady-state operating conditions of the engine.

BRIEF DESCRIPTION OF THE DRAWINGS

The features and advantages of an internal combustion engine according to the present invention and a method of reducing toxic compounds in the exhaust gases of an internal combustion engine in accordance with the present invention will be more clearly understood from the following description in which like reference numerals and characters designate similar members, structures and measurements and in which:

FIG. 18 is a schematic sectional view showing a modification of the flow control valve arrangement of FIG. 11.

DESCRIPTION OF THE PREFERRED EMBODIMENTS

Figure 1:
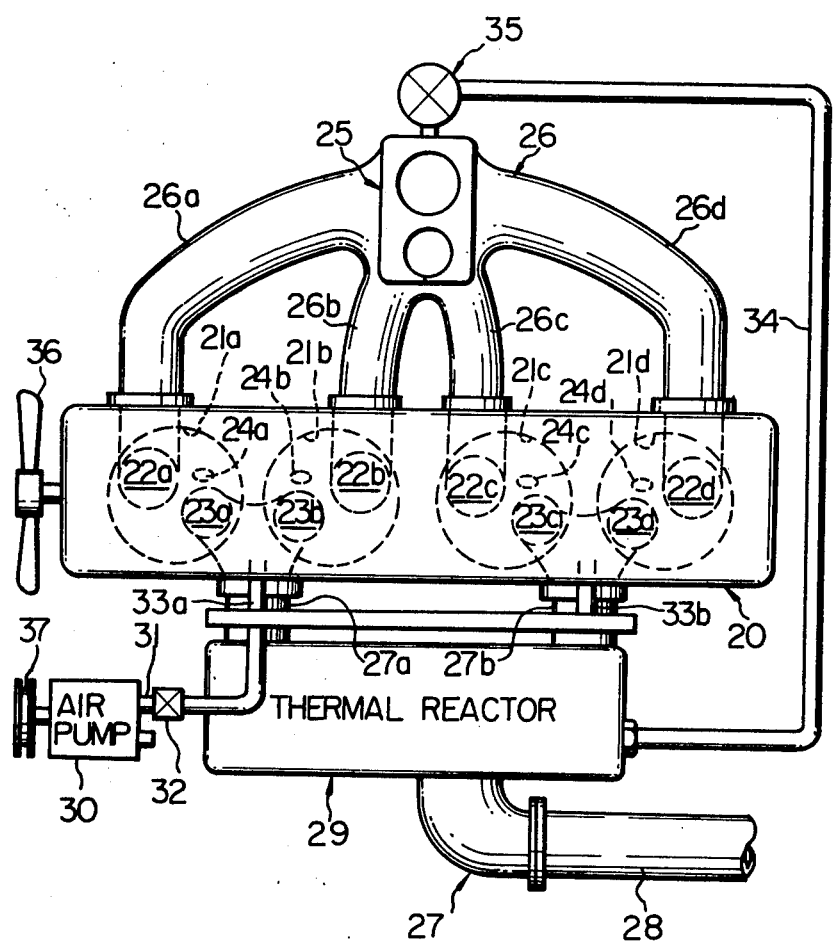
FIG. 1 is a schematic plan view showing a general arrangement of a preferred embodiment of an internal combustion engine according to the present invention.

Reference will now be made to the drawings, first particularly to FIG. 1 which illustrates a general arrangement of a preferred embodiment of a multiple-cylinder reciprocating-piston spark-ignition internal combustion engine according to the present invention. The internal combustion engine comprises an engine block 20 having a suitable number of, herein shown as four, power cylinders 21a, 21b, 21c and 21d which include, as are customary, intake ports 22a, 22b, 22c and 22d, exhaust ports 23a, 23b, 23c and 23d, and ignition spark plugs 24a, 24b, 24c and 24d, respectively, as schematically indicated by broken lines. The internal combustion engine has a mixture supply system which is herein assumed to be a carburetor 25 communicating with the intake ports of the individual power cylinders through an intake manifold 26 which has branch pipe portions 26a, 26b, 26c and 26d leading to the intake ports 22a, 22b, 22c and 22d, respectively. The carburetor 25 is assumed to be of the type which is operative to deliver to the power cylinder an air-fuel mixture leaner than a stoichiometric mixture and thus containing excess air. The construction and arrangement of the carburetor of this nature is well known in the art and will not be herein described. The internal combustion engine further comprises an exhaust system including an exhaust manifold 27 and an exhaust pipe 28 leading from the exhaust manifold 27. The exhaust manifold 27 is shown to have two branch pipe portions 27a and 27b, of which the branch pipe portion 27a is in communication with one pair of neighboring exhaust ports 23a and 23b and the branch pipe portion 27b is in communication with the other pair of neighboring exhaust ports 23c and 23d.

While, thus, the so-called "individual" port arrangement is used for the intake ports 22a, 22b, 22c and 22d, the "siamesed" port arrangement is adopted for the exhaust ports 23a, 23b, 23c and 23d. The advantages achievable of the siamesed exhaust port arrangement as used in the internal combustion engine embodying the present invention will be clarified as the description proceeds. If desired, however, the individual port arrangement may be used for the exhaust ports similarly to the intake ports. The exhaust manifold 27 is arranged with a thermal reactor 29 as exhaust re-combusting means for converting the toxic hydrocarbons and carbon monoxide in the exhaust gases into harmless compounds such as carbon dioxide and water vapor as is well known in the art. To promote the combustion reaction of the exhaust gases in the thermal reactor 29, means are provided to feed fresh air into the exhaust gases in the exhaust manifold 27 entering the thermal reactor 29. The means are shown to comprise an engine-driven air pump 30, an air feed conduit 31, a flow control valve 32 for controlling the flow rate of air through the conduit 31, and branch pipes 33a and 33b leading jointly from the air feed conduit 31 and respectively open into the branch pipe portions 27a and 27b of the exhaust manifold 27. Such means may be dispensed with if the carburetor 25 is designed so that the exhaust gases resulting from the leaned air-fuel mixture delivered from the carburetor contains a sufficiently large amount of excess air enabling the exhaust gases to be fully recombusted in the thermal reactor without the agency of additional air. The exhaust gases thus cleaned in the thermal reactor 29 are partially recirculated by way of an exhaust gas recirculation passageway 34 into the intake manifold 26 at a rate which is controlled by exhaust gas flow control valve means 35 provided in the passageway 34. The exhaust gas recirculation passageway 34 is shown to lead directly from the thermal reactor 29 but, if desired, the passageway 34 may be arranged to lead from the exhaust manifold 27 upstream or downstream of the thermal reactor 29 or even from the exhaust pipe 28 so that the exhaust gases not subjected to the cleaning process in the thermal reactor 29 or the exhaust gases which have been discharged from the thermal reactor 29 are recirculated into the intake manifold 26 through the passageway 34 and the flow control valve means 35. Designated by reference numeral 36 is an engine-driven fan for cooling the engine block 20 and by numeral 37 is a pulley forming part of a belt and pulley arrangement for providing driving connection from the crankshaft of the engine to the air pump 30, though not shown.

Figure 2:
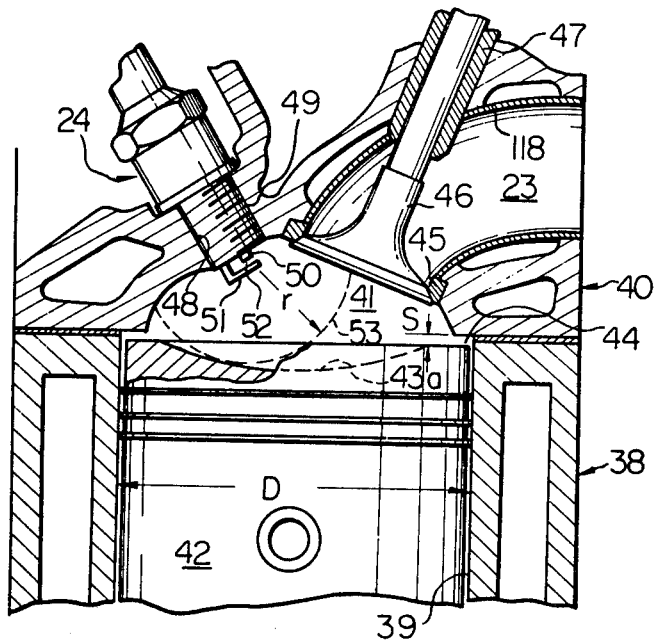
FIGS. 2, 3 and 4 are fragmentary longitudinal sectional views showing examples of the configuration of the combustion chamber in each of the cylinders of the internal combustion engine illustrated in FIG. 1, wherein the cylinder shown in FIG. 2 has a hemispherical combustion chamber, the cylinder shown in FIG. 3 has a wedge-type combustion chamber and the cylinder shown in FIG. 4 has a bathtub-type combustion chamber.
Figure 3:
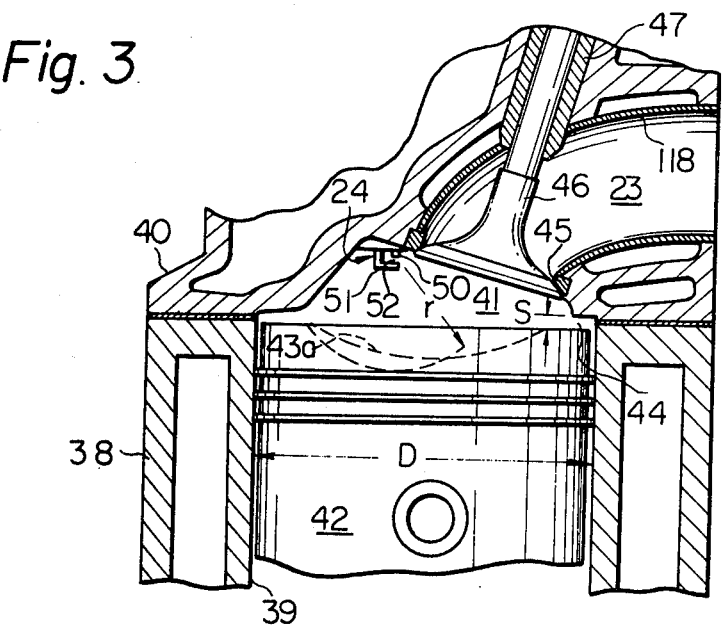
Figure 4:
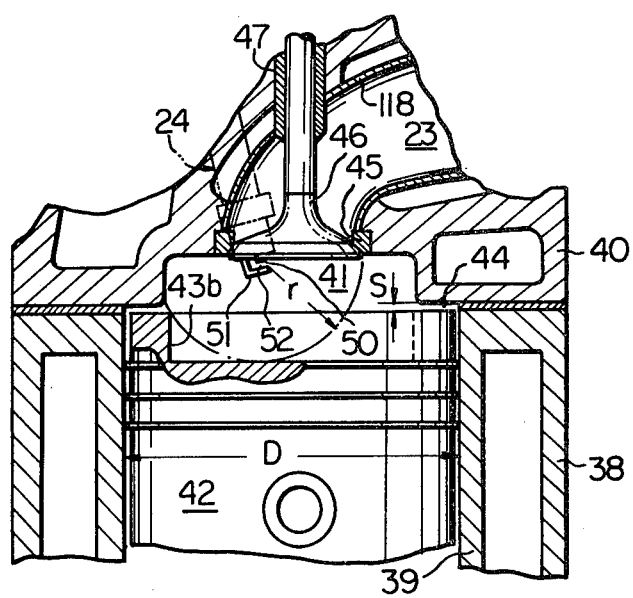

FIGS. 2, 3 and 4 illustrate examples of each of the power cylinders 21a, 21b, 21c and 21d of the internal combustion engine schematically shown in FIG. 1. The power cylinders shown in FIGS. 2, 3 and 4 are all of the overhead valve type and vary in combustion chamber design, having a hemispherical combustion chamber in the arrangement of FIG. 2, a wedge combustion chamber in the arrangement of FIG. 3 and a bathtub combustion chamber in the arrangement of FIG. 4. In each of the power cylinders illustrated in FIGS. 2 to 4, the engine block is shown to consist of a cylinder block 38 formed with a cylinder bore 39 having an open top and a cylinder head 40 formed with an open space 41 above the cylinder bore 39. A reciprocating piston 42 is movable back and forth in the cylinder bore 39 between a top dead center (TDC) position closest to the open space 41 below the cylinder head 40 as shown and a bottom dead center (BDC) position, forming a variable-volume combustion chamber between the cylinder head 40 and the top face of the piston 42. The piston 42 has its head wall portion slightly dished out to form a shallow hemispherical recess 43a in the arrangement of FIGS. 2 or 3 or a shallow bathtub-shaped recess 43d in the arrangement of FIG. 4. Thus, the cylinder has a clearance volume which is constituted in part by the open space 41 below the cylinder head 40 and in part by the additional space in the recess 43a or 43b in the head wall portion of the piston 42 when the piston 42 is in the top dead center position as illustrated. The cylinder head 40 has a low, flat wall portion hanging over an edge portion of the top end of the cylinder bore 39 and forms a squish area 44 between the particular wall portion of the cylinder head 40 and the top face of the piston 42 moved into the top dead center position. The thickness of the squish area 44 is indicated by S, while the diameter of the cylinder bore 39 is indicated by D. Though not shown, the piston 42 is operatively connected, together with the pistons of the other cylinders of the engine, to a crankshaft from which the power output of the cylinders is delivered during operation of the engine, as is customary in the art.

The cylinder head 40 is formed with an intake port (not shown) corresponding to each of the intake ports 22a, 22b, 22c and 22d in the arrangement shown in FIG. 1 and an exhaust port 23 which represents each of the exhaust ports 23a, 23b, 23c and 23d in the arrangement of FIG. 1. The cylinder head 40 has an annular groove (not numbered) formed at the terminal end of the exhaust port 23 and has closely received in the groove a ring-shaped valve seat member 45 having one end face exposed to the open space 42 in the cylinder head 40. A poppet-type exhaust valve 46 has a valve head portion and a valve stem portion and is axially movable through a sleeve-shaped valve stem guide member 47 fixedly mounted on the cylinder head 40 so as to close and open the exhaust port 23 at the valve seat member 45 by the head portion of the valve 46. Though not shown, the valve 46 is biased to press against the valve seat member 45 and thus close the exhaust port by means of a valve spring connected to the upper end of the valve stem and is driven against the force of the spring to open the exhaust port 23 by means of a valve driving mechanism including a valve lifter and a cam driven by the crankshaft of the engine, as is well known in the art. Essentially similar valve arrangement is made for an intake valve (not shown) for closing and opening the intake port in synchronism with the revolution of the crankshaft, as is customary.

The cylinder head 40 has a wall portion formed with a tapped hole 48 (FIG. 2) in which an ignition spark plug 24 representing each of the previously mentioned spark plugs 24a, 24b, 24c and 24d in the arrangement of FIG. 1 is mounted. As is best seen in FIG. 2, the spark plug 24 has an externally threaded shell assembly 49 from which a center electrode 50 and a ground electrode 51 project into the open space 41 in the cylinder head 40. As is customary, the ground electrode 51 extends in parallel with the center electrode 50 and has a leading end portion perpendicularly bent to have its tip spaced apart from the leading end of the center electrode 50 for forming a spark gap 52 between the leading ends of the electrodes 50 and 51. The spark plug 24 forms part of the ignition system of the internal combustion engine and, thus, the center electrode 50 is electrically connected to one of the cap terminals of the ignition distributor for being energized when the point contacts of the distributor are opened as the distributor rotor of the distributor is rotated.

Figure 5:
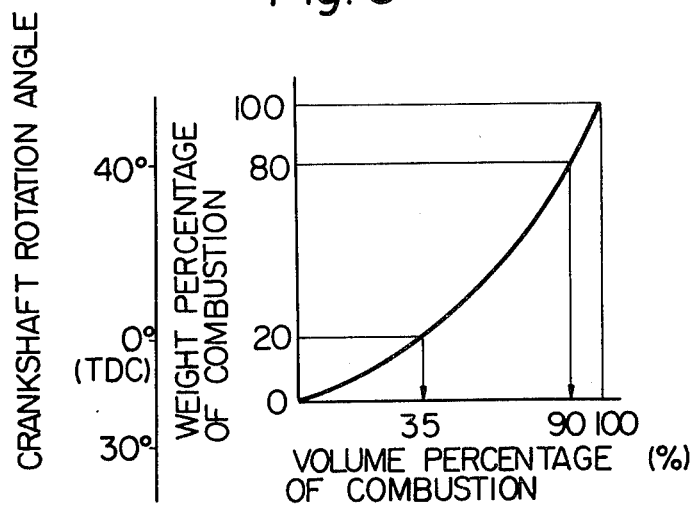
FIG. 5 is a graph which indicates a general relationship between the weight and volume percentages of air-fuel mixture combusted during a single power stroke of a cylinder in a usual internal combustion engine and a relationship between the percentage by weight of the combusted air-fuel mixture and the angle of rotation of the crankshaft of the engine.

A series of experiments which the inventors of the present application conducted with usual reciprocating-piston spark-ignition internal combustion engines of the general nature above described proved that the engine is capable of producing sufficiently stable performance characteristics if at least approximately 80 percent by weight of the air-fuel mixture drawn into the combustion chamber during intake stroke of the piston is combusted by the time at which the piston is moved back from the top dead center position through a distance approximately 15 percent of the total distance of stroke of the piston or, in terms of the angle of the crankshaft rotation, at approximately 40° or more past the top dead center on the succeeding stroke of the piston. To achieve such a combustion condition, the air-fuel mixture drawn into the combustion chamber during the intake stroke of the piston must have been combusted at least 20 percent by weight or, in other words, at least 35 percent by volume by the time at which the piston reaches the top dead center position at the end of the compression stroke, as will be understood from the curve of FIG. 5 which shows a general relationship between the weight and volume percentages of air-fuel mixture combusted during a power stroke and a relationship between the percentage by weight of the combusted mixture and the angle of rotation of the crankshaft on the power stroke.

On the other hand, the front of the flame produced in the spark gap 52 (FIG. 2) of the ignition spark plug 24 toward the end of the compression stroke radiates out in a generally spherical fashion as indicated in phantom by reference numeral 53 from the spark gap 52 through the air-fuel mixture in the combustion chamber toward the top face of the piston 42 which is being moved up toward the top dead center piston. If, in this instance, the increasing radius of the generally spherical combusted region 53 expanding about the center point of the spark gap 52 is represented by $r$ as indicated in each of FIGS. 2, 3 and 4, the radius $r$ can be expressed as the product of the combustion rate Vc in meters per second of the air-fuel mixture and the period of time T between the instant at which the mixture is initially fired toward the end of a compression stroke of the piston and the instant at which the piston reaches the top dead center position at the end of the compression stroke. The time T in turn is expressed as $$T = (60/N) \times (\theta/360), \qquad (1)$$

where N is the revolution speed of the engine crankshaft (which speed is herein assumed to be variable between approximately 1200 rpm and approximately 2400 rpm) and $\theta$ is a crankshaft rotation angle by which the ignition timing is advanced from the top dead center. The value of $\theta$ is preferably given by the lower limit of a predetermined range of the ignition timing that will provide sufficiently stable performance characteristics of an engine and an acceptable temperature range of the exhaust gases. The radius $r$ of the above-mentioned generally spherical combusted region 53 is, hence, given by $$r = V_c T = (60/N) \times (\theta/360) \times V_c = (\theta \cdot V_c)/(6N) \qquad 2$$

If, thus, the combustion rate $V_c$ of the air-fuel mixture in a combustion chamber is 15 meters per second as usual and the revolution speed N of the engine crankshaft is 2000 rpm and if the spark advance angle $\theta$ is set at 30° crankshaft rotation angle with a view to providing the best possible combustion condition during city driving of a vehicle with the engine operating at 2000 rpm, then the radius $r$ of the generally spherical combusted region 53 within the combustion chamber can be obtained as follows:

$$r = (60/2000) \times (30/360) \times 15 \text{ meters} = 3.75 \times 10^{-2} \text{ meters} = 37.5 \text{ millimeters}.$$

As previously noted, a usual reciprocating-piston spark-ignition internal combustion engine is permitted to produce sufficiently stable performance characteristics if at least 35 percent by volume of the air-fuel mixture inducted into a combustion chamber is combusted by the time at which the piston reaches the top dead center position at the end of compression stroke in each cycle of operation of an engine cylinder. To realize such a combustion condition in an internal combustion engine embodying the present invention, the ignition spark plug 24 in each of the engine cylinders shown in FIGS. 2, 3 and 4 is located so that the volume of the generally spherical combusted region 53 or, in other words, the space enclosed within a spherical envelope having the radius $r$ in the combustion chamber about the firing point of the spark plug 24, viz., the center point of the spark gap 52 between the center and ground electrodes 50 and 51 of the spark plug 24 occupies at least 35 percent of the total volume of the combustion chamber provided by the piston 42 in the top dead center position, viz., the clearance volume of the cylinder. The spark plug 24 being thus arranged in the cylinder having the hemispherical, wedge or bathtub combustion chamber as in FIG. 2, 3 or 4, the center point of the spark gap 53 is located in close proximity to that point within the open space 41 in the cylinder head 40 which is found on the center axis of the combustion chamber and which is remotest from the cylinder bore 39.

When an internal combustion engine is operating at a speed within the previously specified range of from about 1200 rpm to about 2400 rpm, the spark advance angle $\theta$ is controlled to vary approximately in proportion to the engine speed N within such a range. The time period T in Equation 2 is, for this reason, maintained substantially constant when a vehicle is running in a city area. In view, moreover, of the fact that the combustion rate Vc in an internal combustion engine is usually limited within an extremely narrow range at an engine speed within the above specified range, the radius $r$ in Equation 1 is also maintained substantially constant insofar as the engine is being operated at such a speed. If, thus, the radius $r$ of the generally spherical combusted area 53 having the volume greater than 35 percent of the clearance volume of an engine cylinder under the condition in which the engine is operating at a speed within the range of, for example, between about 1200 rpm and about 2400 rpm is represented specifically by $r_o$, it is preferable that the recess 43a in the piston 42 of the arrangement shown in each of FIGS. 2 and 3 or the recess 43b in the piston 42 of the arrangement shown in FIG. 4 be configured in such a manner as to fully accommodate the reach of the spherical combusted region 53 having the radius $r_o$.

Figure 6:
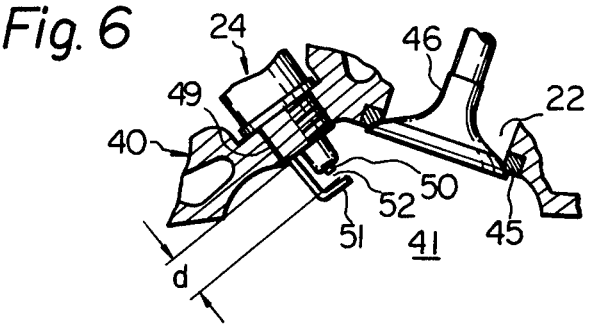
FIG. 6 is a fragmentary sectional view showing, to an enlarged scale, a preferred example of the arrangement of an ignition spark plug in an internal combustion engine embodying the present invention.
Figure 7:
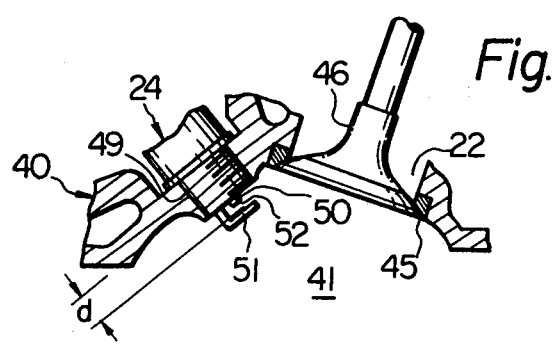
FIG. 7 is a view similar to FIG. 6 but shows another preferred example of the spark plug arrangement in an internal combustion engine embodying the present invention.

The flame travel in the combustion chamber can be further shortened by increasing the length of "reach" with which the spark plug or, more exactly the threaded portion of the shell assembly of the spark plug, projects into the combustion chamber so that the firing point of the spark plug is located at an increased distance from the internal surface of a wall portion of the cylinder head in which the spark plug is mounted. Because, however, of the extremely high temperature reached during the power stroke in the combustion chamber, there is a limitation in increasing the projecting length or reach of the spark plug for the protection of the plug, especially the shell assembly thereof from the attack of the heat of the combusted gases. Experiments have therefore been conducted by the inventors in quest of an acceptable range of the projecting length of a spark plug which is arranged to have its firing point located in accordance with the previously described basic principle according to the present invention. Such experiments have revealed that it is advantageous, for the purpose of reducing the flame travel without impairing the durability of the spark plug, to have the spark plug 24 arranged in such a manner that the firing point of the spark plug 24, viz., the middle point of the spark gap 52 of the plug is located at a distance $d$ within the range of between about 2 millimeters and about 7 millimeters from the internal surface of the cylinder head 40 as shown in FIG. 6 or 7 or of any other structural part of the engine block in which the spark plug 24 is mounted. Such a scheme may be put into practice by modifying usual spark plug measurements so that the center and ground electrodes 50 and 51 project with increased lengths from the leading end of the shell assembly 49 which is totally embedded in the cylinder head 40 as shown in FIG. 6 or in any other structural part of the engine block in which the spark plug is mounted. Alternatively, the spark plug 24 per se may be of usual measurements and mounted on the cylinder head 40 or any other structural part of the engine block in such manner that the threaded shell assembly 49 has a forward end portion projecting slightly into the combustion chamber, as in the case of the spark plug arrangement illustrated in FIG. 7. The experiments have further proved that, in whichsoever method the spark plug 24 may be arranged, it is further preferable to have the center and ground electrodes 50 and 51 of the plug configured so that the spark gap 52 between the electrodes measures within the range between about 1.1 millimeter and about 2.0 millimeters. The experiments conducted by the inventors have also revealed that, when the center and ground electrodes 50 and 51 of the spark plug 24 are arranged in this fashion, excellent firing performance can be achieved if the electric circuit of the ignition system is designed to produce between the electrodes 50 and 51 a sparking voltage which will generate a thermal energy of about 100 milli-joules when the spark plug 24 is energized.

Figure 8:
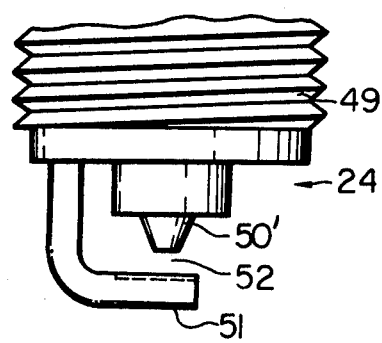
FIG. 8 is a partial elevation view showing a preferred example of the configuration of an ignition spark plug in an internal combustion engine embodying the present invention.
Figure 9:
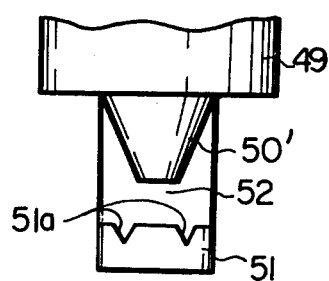
FIG. 9 is another partial elevation view showing the configuration of the spark plug illustrated in FIG. 8.

The firing performance of the spark plug 24 can be further improved without causing melting of the electrodes 50 and 51 by increasing the strength of the electric field within the spark gap 52 between the electrodes. This may be put into practice by modifying the spark plug 24 so that the center electrode 50 has a tapered end portion 50' as shown in FIG. 8 and/or the ground electrode 51 is formed with a suitable number of grooves 51a in its laterally bent end portion defining one end of the spark gap 52 as illustrated in FIG. 9 in which the grooves 51a are shown to be provided as two in number by way of example. In this instance, it is preferable that the measurements, particularly the cross sectional area and the tapering angle, of the center electrode 50' and/or the measurements, particularly the width, depth and number of the grooves 51a, of the ground electrode 51 be selected so that the discharge area between the center and ground electrodes becomes approximately one fourth of the discharge area of an ordinary spark plug which typically has a center electrode measuring about 2 to 2.5 millimeters in diameter.

The combustion of the air-fuel mixture in the combustion chamber of an engine cylinder can be promoted to proceed faster by modifying the measurements, especially the thickness and the cross sectional area or extent of the squish area or region 44 which is formed in the clearance volume space 41 in the combustion chamber due to the difference between the total area of the internal surface of the cylinder head 40 and the cross sectional area of the cylinder bore 39 (FIGS. 2, 3 and 4). The results of experiments conducted by the inventors show that an acceptable burning rate of the charge in the combustion chamber is achieved, in an internal combustion engine of the basic character herein specified, when the ratio of the cross sectional extent or area of the squish area or region 44 vs. the cross sectional area ($\pi D^2/4$) of the cylinder bore 39 is within the range of between about 0.1:1 and about 0.45:1 and the thickness S of the squish area or region 44 is within the range of between about 1.05 millimeter and about 2.5 millimeters. With such measurements of the squish area 44, sufficient turbulence is produced in the mixture gases in the combustion chamber toward the end of the compression stroke so that the charge is allowed to uniformly distribute throughout the combustion chamber and the flame front is caused to radiate out irregularly about the firing point of the spark plug 24, thereby promoting the combustion reaction to take place at an increase rate. If the thickness S of the squish area 44 is larger than the upper limit 2.5 millimeters of the above specified range, the turbulence of such a degree cannot be achieved in the combustion chamber and if, conversely, the thickness S of the squish area 44 is smaller than the lower limit 1.05 millimeter, then the end gases tend to be quenched excessively with the result that an increased quantity of hydrocarbons in the mixture charge are left unburned. The combustion condition will be further stabilized if suitable means (not shown) is provided so as to induce a swirling tendency in the mixture gases in the combustion chamber in addition to the squish area arrangement above described.

By incorporating the hereinbefore described various improvements into an internal combustion engine, not only the flame travel in the combustion chamber can be reduced but the combustion velocity of the mixture charge can be increased satisfactorily without impairing the stability of operation and performance efficiency of the engine. Thus, the combustion reaction can be completed in the least possible time after the mixture gases produced in the combustion chamber are ignited by the spark plug 24. This compensates for the reduction in the combustion rate as caused by the increased proportion of the inactive gases in the mixture gases produced in the combustion chamber and, for this reason, will enable the engine of the described general character to operate in proper and stable condition even though the mixture gases in the combustion chamber contains the inactive compounds in an increased proportion. As previously noted, the inactive compounds herein referred to are those components of the mixture gases produced in a combustion chamber which do not lend themselves to the combustion reaction taking place in the combustion chamber and include the nitrogen component in the air-fuel mixture inducted into the combustion chamber during the intake stroke in each cycle of operation of the cylinder, the residual exhaust gases which have failed to be discharged from the combustion chamber during the exhaust stroke in the preceding cycle of operation and, thus, remaining in the combustion chamber, the carbon dioxide and water vapor components in the exhaust gases recirculated and admixed to the combustible charges in the air-fuel mixture and, if the air-fuel mixture is leaned, the excess are contained in the air-fuel mixture.

If, now, it is assumed that 14.7 kilograms of fresh air (which is herein assumed to consist of 21 percent of oxygen and 79 percent of nitrogen on a weight basis) is required for achieving complete combustion of 1 kilogram of fuel in view of the theoretical air-to-fuel ratio of approximately 14.7:1 of a stoichiometric air-gasoline mixture, the quantity of the nitrogen component contained in the fresh air is, in consideration of the molecular weight 32 of oxygen and the molecular weight 28 of nitrogen, obtained as follows:

$$14.7 \times (28 \times 0.79)/(32 \times 0.21 + 28 \times 0.79) = 11.3, \text{kgs}.$$

The weight per unit volume of the exhaust gases emitted from an automotive internal combustion engine is usually approximately equal to the weight per the same volume of atmospheric air. Furthermore, the excess air contained in an air-fuel mixture which is leaner than a stoichiometric mixture must theoretically be totally left unconsumed in the combustion reaction which has been effected in a combustion chamber. If, therefore, the ratio, designated by R, of the total weight of the inactive gases consisting of the recirculated exhaust gases, the residual exhaust gases and the excess air in a leaned air-fuel mixture contained 1 kilogram of fuel (gasoline) component, viz., the weight of the mixture gases produced in a combustion chamber minus the weight of the inducted air-fuel mixture containing 1 kilogram of fuel versus the weight 14.7 kilograms of air required for the complete combustion of the 1 kilogram of fuel is assumed to be 1 vs. 10, then the weight of the inactive gases (which are thus assumed to exclude the nitrogen component in the 14.7 kilograms of air to be reacted upon by the 1 kilogram of fuel) will amount to approximately 1.5 kilogram ($\simeq 14.7$ kgs $\times 0.1$). It therefore follows that the total weight of the inactive gases including the nitrogen component in the air required for the complete combustion of the fuel becomes approximately 12.8 kilograms (= 1.5 kg $\times$ 11.3 kgs). (In this context, attention is invited to the fact that, if a leaned air-to-fuel mixture is used, excess air is contained not only in the air-fuel mixture inducted into the combustion chamber but also in the recirculated exhaust gases and residual exhaust gases which have resulted from the air-fuel mixture supplied in the preceding cycle or cycles of operation of the engine.) If, similarly, the above-mentioned ratio R is 1 vs. 20, then the weight of the inactive gases will amount to approximately 2.9 kilograms ($\simeq 14.7$ kgs $\times 0.2$) so that the total weight of the inactive compounds including the nitrogen component in the air to be reacted upon, without excess and deficiency, by 1 kilogram of fuel becomes approximately 14.2 kilograms (= 2.9 kgs $\times$ 11.3 kgs). The following table is thus obtained for various values of the ratio R, wherein column "A" indicates the total weight of the inactive compounds contained in the mixture gases produced in a combustion chamber but excluding the nitrogen component in the air to be consumed in the combustion reaction with 1 kilogram of fuel and column "B" indicates the total weight of the inactive compounds which are inclusive of the nitrogen component.

| Ratio "R" | "A" (14.7 kgs × R) | "B" "A" + 11.3 kgs |
|---|---|---|
| 1/10 | Approx. 1.5 | 1.5 + 11.3 = 12.8 |
| 1.5/10 | Approx. 2.2 | 2.2 + 11.3 = 13.5 |
| 2/10 | Approx. 2.9 | 2.9 + 11.3 = 14.2 |
| 3/10 | Approx. 4.4 | 4.4 + 11.3 = 15.7 |
| 4/10 | Approx. 5.9 | 5.9 + 11.3 = 17.2 |
| 5/10 | Approx. 7.4 | 7.4 + 11.3 = 18.7 |
| 6/10 | Approx. 8.8 | 8.8 + 11.3 = 20.1 |
| 7/10 | Approx. 10.3 | 10.3 + 11.3 = 0 21.6 |
| 8/10 | Approx. 11.8 | 11.8 + 11.3 = 23.1 |

The numerical values indicated on the right sides of the individual equations in column "B" of the above table thus show the ratios, denoted by P, of the total quantities by weight of the inactive compounds (including the nitrogen component in the air contributing the combustion of the fuel) contained in the mixture gases produced in a combustion chamber versus the quantity by weight of the fuel component in the air-fuel mixture forming part of the mixture gases. If, thus, the mixture gases produced in the combustion chamber contain the recirculated exhaust gases and the residual exhaust gases in the ratios of, for example, 3 vs. 10 and 1.5 vs. 10, respectively, to the quantity of the air which will contribute to the combustion reaction on a weight basis and if the air-fuel mixture (which is assumed to be a mixture of air and gasoline) is proportioned to have a stoichiometric air-to-fuel ratio of approximately 14.7:1 and thus contains no excess air, then the ratio P of the total weight of the inactive compounds in the mixture gases to the weight of the fuel component of the stoichiometric air-fuel mixture is calculated as approximately 17.9:1 from 4.4 + 2.2 + 11.3 = 17.9 in view of the values in column "A" of approximately 4.4 for the ratio 3/10 of the recirculated exhaust gases and approximately 2.2 for the ratio 1.5/10 of the residual exhaust gases, as indicated in the above table. If, as another example, the air-fuel mixture contained in the mixture gases produced in the combustion chamber is leaned out to have an air-to-fuel ratio of approximately 16.2 providing the excess air factor of approximately 1.1 and if the mixture gases contain the recirculated exhaust gases and the residual exhaust gases each in the ratio of 1 vs. 10 as well as the excess air in the ratio of 1 vs. 10 to the quantity of air which will lend itself to the combustion reaction with the fuel, then the ratio P as above defined is given as approximately 15.7 from 1.5 $\times$ 3 + 11.3 = 15.7 in consideration of the value 1.5 in column "A" of the above table for the ratio 1/10 of each of the recirculated exhaust gases, residual exhaust gases and excess air.

Extensive experiments have been conducted by the inventors of the present application in an effort to determine an optimum range of the above defined ratio P in internal combustion engines in which the spark plugs are arranged on the previously described basic principle of the present invention. As a result of such experiments, it has been ascertained that the optimum range of the ratio P is between about 13.5:1 and about 22.5:1, which corresponds to the range of between about 2.2:1 and about 11.2:1 for the ratio R when the nitrogen component in the air of the quantity contributing to the combustion reaction with the fuel is not taken into account. If the ratio P is reduced below the lower limit 13.5:1 of the above specified range, the concentration of the nitrogen oxides in the exhaust gases cannot be lessened satisfactorily. If, conversely, the ratio P is increased beyond the upper limit 22.5:1 of the above specified range, the combustion reaction fails to proceed stably with consequent deterioration of the power output efficiency and the fuel economy of the engine and, furthermore, the reduction attained in the concentration of the nitrogen oxides is not to such as extent as can be more than offset by the degraded performance of the engine.

Figure 10:
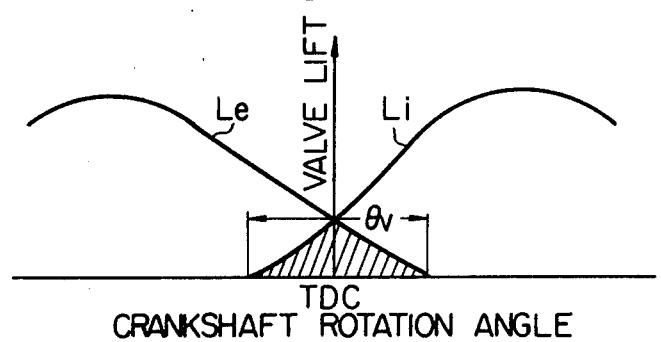
FIG. 10 is a graph indicative of the motions of the intake and exhaust valves in an engine cylinder producing a valve overlap across the top dead center.

The above-mentioned optimum range of the ratio P may be achieved in an internal combustion engine arranged as illustrated in FIG. 1 and FIG. 2, 3 or 4 by appropriately controlling the flow rate of the recirculated exhaust gases through the flow control valve means 35 of the exhaust-gas recirculation arrangement shown in FIG. 1 and/or the air-to-fuel ratio of the mixture to be produced in the mixture supply system such as the carburetor 25 in the arrangement of FIG. 1 so that the mixture contains excess air in a proportion that will provide the range of the ratio P. As an alternative or in addition to the control of the exhaust gas recirculation rate and/or the air-to-fuel ratio of the mixture delivered from the mixture supply system, the quantity of the residual exhaust gases may be controlled by modifying valve overlap in each of the engine cylinders 21a, 21b, 21c and 21d in the arrangement of FIG. 1. As is well known in the art, the intake valve is timed to start to open before the piston reaches the top dead center position on the exhaust stroke and the exhaust valve is timed to fully close past the top dead center on the subsequent intake stroke of the cylinder, as can be seen from FIG. 10 in which curves Li and Le indicate the variation of the valve lifts of the intake and exhaust valves, respectively, in the vicinity of the top dead center between the exhaust and intake strokes of an engine cylinder. Both the intake and exhaust valves are thus partly open concurrently when the piston is being moved up to and down from the top dead center position between the exhaust and intake strokes of the engine and provides a valve overlap $\theta v$ as indicated by the hatched area in FIG. 10. Experiments conducted by the inventors have revealed that a valve overlap $\theta v$ within the range of from about 30° to about 50° in terms of the crankshaft rotation angle results in a ratio within the range of from about 1.5 vs. 10 to about 2.5 vs. 10 between the quantity of the residual exhaust gases and the quantity of air contributing to the combustion reaction with the fuel. This means that, if the intake and exhaust valves are timed to achieve a valve overlap $\theta v$ within the range of between 30° and 50° of crankshaft rotation angle, the previously defined ratio P becomes a value within the range of between about 13.5:1 and about 15.0:1 when the quantities of other inactive gases such as the recirculated exhaust gases and the excess air in a leaned air-fuel mixture are not taken into account. If, therefore, the exhaust gas recirculation rate and/or the air-to-fuel ratio of the mixture delivered from the mixture supply system of the engine which is arranged to provide a valve overlap $\theta v$ within the above specified range are controlled in such a manner as to fill up the shortage of up to 7.5:1 (which equals 22.5:1 minus 15.0:1) of the ratio P, the ratio P will be limited within the previously specified range of between 13.5:1 and about 22.5:1.

If desired, the quantity of the residual exhaust gases may be controlled by provision of suitable valve means (not shown) adapted to control the back pressure in the exhaust system.

Further experiments have been conducted by the inventors in quest of cylinder bore and piston stroke measurements which are most desirable for the combustion of the mixture gases containing the inactive compounds in a proportion within the above specified range. The results of the experiments teach that the advantages achieved by the use of the mixture gases of such a nature can be exploited most effectively when the diameter D of the cylinder 39 (see FIGS. 2, 3 and 4) is less than 95 millimeters and, at the same time, the cylinder bore and piston stroke measurement are so selected as to provide a compression ratio within the range of between about 8.0:1 and 10.5:1. If the cylinder is designed to have a diameter larger than 95 millimeters in an internal combustion engine using the mixture gases of the above-mentioned nature, there only results deterioration in the power output efficiency of the engine and the concentration of nitrogen oxides in the exhaust gases cannot be reduced satisfactorily even though the spark plug is located to provide optimum combustion conditions in a manner previously described. If, furthermore, the compression ratio is reduced below the lower limit 8.0:1 of the above specified range, then the power output efficiency is also decrease in the power output efficiency of the engine and if, conversely, the compression ratio is increased beyond the upper limit 10.5:1 of the above specified range, then abnormal combustion results and causes detonation in the engine. If, however, the cylinder bore diameter and the compression stroke are limited within the above specified ranges, the engine is enabled to operate in stable conditions even when increased quantities of inactive gases are admixed to the air-fuel mixture.

Figure 11:
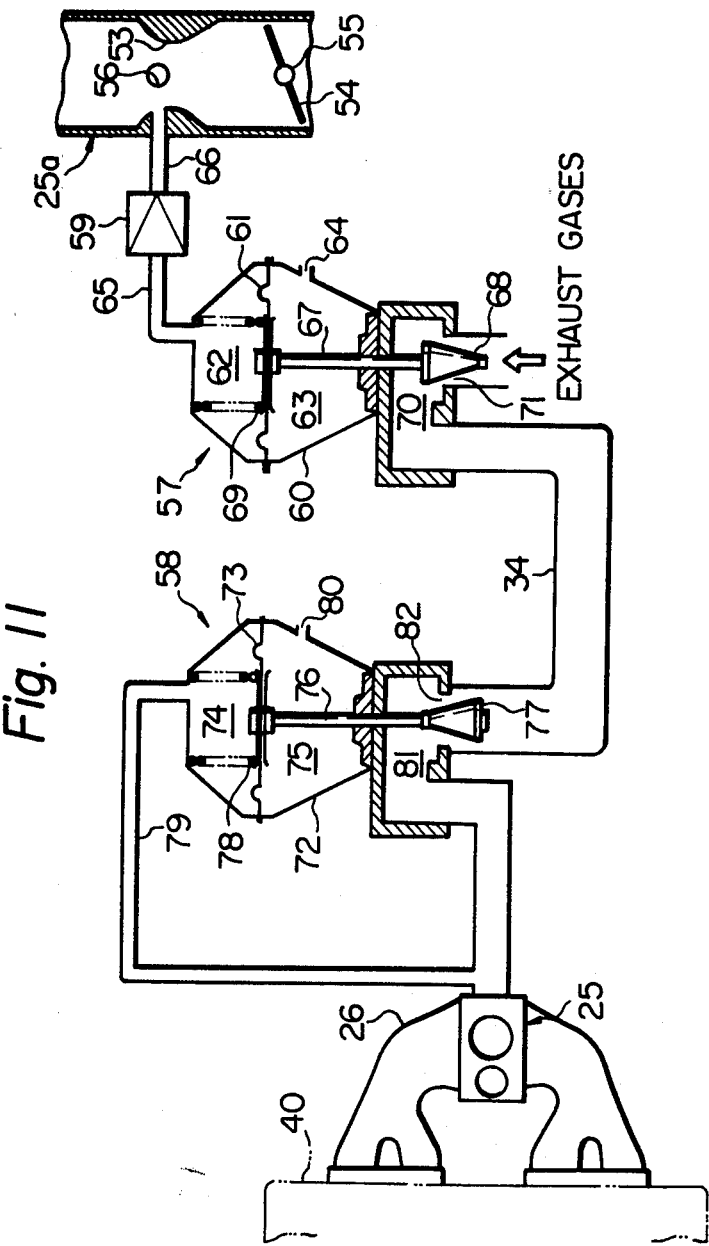
FIG. 11 is a schematic view showing, partially in section, a preferred example of the flow control valve arrangement of an exhaust gas recirculation system incorporated into an internal combustion engine embodying the present invention.

FIG. 11 shows a preferred example of the construction of the exhaust gas flow control valve means 35 for exploiting the advantages achieved by the improvements according to the present invention. In the description to follow, the term "recirculated exhaust-gas ratio" refers to the ratio of the quantity by weight of the recirculated exhaust gases contained in the mixture gases produced in the combustion chamber of each power cylinder of an internal combustion engine versus the quantity by weight of air contained in the air-fuel mixture forming part of the mixture gases in each cycle of operation of the cylinder.

Referring to FIG. 11, the exhaust gas flow control valve means 35 is operated in response to the suction or vacuum developed in the intake manifold 26 of the engine and further to the suction or vacuum which is developed in the carburetor 25 having a mixture delivery pipe 25a. The mixture delivery pipe 25a is formed with a venturi 53 and has a carburetor throttle valve 54 located downstream of the venturi 53 and rotatable with a shaft 55, as is customary. Though not shown, the carburetor 25 has a main fuel delivery circuit including a main fuel discharge nozzle which is open into the venturi 53 as at 56 for injecting fuel into the venturi 53 by the suction built up in the venturi. Though not shown, furthermore, the mixture delivery pipe 25a is in communication with the atmosphere through an air cleaner and an air horn located upstream of the venturi 53 and terminates in the intake manifold 26, as is well known. The throttle valve 54 is driven from an accelerator pedal (not shown) for rotation about the axis of the shaft 55 between a fully open position to produce high-load operating conditions in the engine and a fully closed position to produce low-load operating conditions in the engine through a part throttle position to produce medium-load operating conditions in the engine, as is also well known. When the throttle valve 54 is in the fully closed position or in a slightly open position as indicated in FIG. 11 with the engine operating in idling condition requiring a minimum quantity of fuel, the gas pressure in the venturi 53 is approximately equal to the atmospheric pressure and, as a consequence, substantially no vacuum is developed in the venturi 53. As the engine speed is increased and/or the throttle valve 54 is moved to open wider, the vacuum in the venturi 53 is increased accordingly and peaks up when the throttle valve 54 moved into the fully open position at high engine speeds. The vacuum developed in the venturi 53 is, thus, the indication of the engine speed and load.

The exhaust gas flow control valve means 35 comprises vacuum operated first and second flow control valve units 57 and 58 and a vacuum amplifier unit 59 which is illustrated only diagrammatically in FIG. 11. The first flow control valve unit 57 comprises a valve casing 60 having its internal space divided by a diaphragm 61 into a vacuum-acting variable-volume chamber 62 and an atmospheric chamber 63 which is constantly in communication with the atmosphere through a vent 64 formed in the valve casing 60. The variable-volume chamber 62 is in communication with an outlet port (not shown) of the vacuum amplifier unit 59 through a passageway 65 and the vacuum amplifier unit 59 in turn has an inlet port (not shown) communicating with the venturi 53 in the mixture delivery pipe 25a of the carburetor 25 through a passageway 66. An actuating rod 67 extends through the atmospheric chamber 63 in the valve casing 60 from that side of the diaphragm 61 which is remote from the variable-volume chamber 62. The actuating rod 67 projects out of the valve casing 60 and has carried at its leading end a forwardly tapered valve element 68 which projects into the exhaust gas recirculation passageway 34 as shown. The diaphragm 61 is continuously movable between a position producing a maximum-volume condition of the variable-volume chamber 62 and a position producing a minimum-volume condition of the variable-volume chamber 62 depending upon the strength of vacuum developed in the chamber 62 and is urged toward the former position producing the maximum-volume condition of the chamber 62 by means of a preload spring 69 which is positioned within the variable-volume chamber 62.

Figure 12:
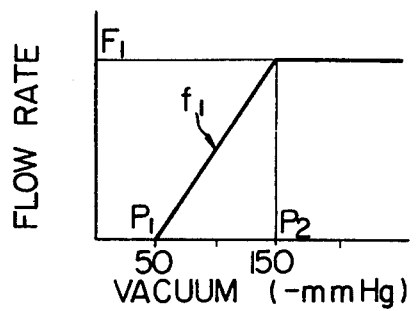
FIG. 12 is a graph showing a preferred example of the flow characteristics, in terms of the vacuum developed in the venturi in the mixture supply system of an engine, of one flow control valve unit in the valve arrangement of FIG. 11.

The first flow control valve unit 57 further comprises a flow control chamber 70 located in the exhaust gas recirculation passageway 34 leading from the exhaust system as illustrated in FIG. 1. The flow control chamber 70 has an inlet port 71 into which the forwardly tapered valve element 68 on the actuating rod 67 projects. The valve element 68 is, thus, axially movable with the diaphragm 61 and the actuating rod 67 between a first position fully closing the inlet port 71 and a second position providing a maximum degree of opening in the inlet port 71. The valve element 68 is moved into the first and second positions thereof when the diaphragm 61 is moved into the positions providing the maximum-volume and minimum-volume conditions, respectively, of the variable-volume chamber 62. For purposes of description, it is herein assumed that the diaphragm 61 is moved into the position providing the maximum-volume condition of the variable-volume chamber 62 in response to vacuum lower than a predetermined first level $P_1$ of minus 50 millimeters of mercury ($-50$ mmHg) and into the position providing the minimum-volume condition of the variable-volume chamber 62 in response to vacuum higher than a second predetermined level $P_2$ of minus 150 millimeters of mercury ($-150$ mmHg). The valve element 68 is thus continuously moved between its first position fully closing the inlet port 71 of the flow control chamber 70 with the vacuum in the variable-volume chamber 62 lower than the level $P_1$ of $-50$ mmHg and its second position providing the maximum degree of opening in the inlet port 71 with the vacuum in the variable-volume chamber 62 higher than the level $P_2$ of $-150$ mmHg. Such performance characteristics of the valve unit 57 will be achieved by suitably selecting the measurements of the diaphragm 61 and/or the spring constant of the preload spring 69. The flow rate of the recirculated exhaust gases through the flow control chamber 70 is thus continuously controlled between zero and a maximum $F_1$ as the vacuum developed in the variable-volume chamber 62 varies between the first and second predetermined levels $P_1$ and $P_2$ of the above specified values. FIG. 12 illustrates a flow characteristic curve $f_1$ which is achieved by the first flow control valve unit 57.

The second flow control valve 58 is constructed largely similarly to the above described first valve unit 57 and comprises a valve casing 72 which is internally divided into a vacuum-acting variable-volume chamber 74 and an atmospheric chamber 75, an actuating rod 76 extending through the atmospheric chamber 75 from the diaphragm 73 and projecting outwardly from the valve casing 72, a valve element 77 carried at the leading end of the actuating rod 76, and a preload spring 78 positioned within the variable-volume chamber 74. The variable-volume chamber 74 is in constant communication with the intake manifold 26 of the engine through a passageway 79, while the atmospheric chamber 75 is in communication with the open air through a vent 80 formed in the valve casing 72. While the valve element 68 of the first flow control valve unit 57 is forwardly tapered, the valve element 77 of the second flow control valve unit 58 has a counter-tapered, generally frusto-conical configuration having a cross section or diameter which is continuously increased toward the leading end of the valve element 77 as shown. The diaphragm 73 is continuously movable between a position providing a maximum-volume condition of the variable-volume chamber 74 and a position providing a minimum-volume condition of the variable-volume chamber 74 depending upon the vacuum developed in the chamber 74 and is biased toward the former position by the preload spring 78, as in the case of the first flow control valve unit 57.

Figure 13:
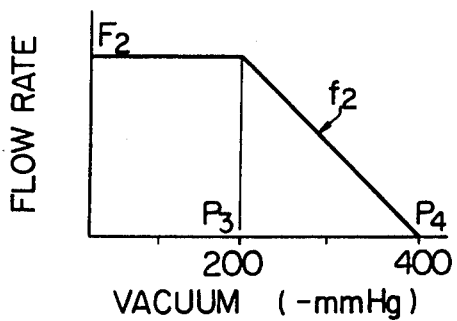
FIG. 13 is a graph similar to FIG. 12 but shows a preferred example of the flow characteristics, in terms of the vacuum developed in the intake manifold of the engine, of another flow control valve unit provided in the valve arrangement illustrated in FIG. 11.

The second flow control valve unit 58 further comprises a flow control chamber 81 which is located in the exhaust gas recirculation passageway 34 downstream of the flow control chamber 70 of the first valve unit 57. The flow control chamber 81 has an inlet port 82 into which the valve element 77 of the second valve unit 58 axially projects as shown. The valve element 77 is thus axially movable with the diaphragm 73 and the actuating rod 76 between a first position providing a maximum degree of opening in the inlet port 82 and a second position fully closing the inlet port 82. The valve element 77 is moved into its first and second positions when the diaphragm 73 is moved into the positions producing the maximum-volume and minimum-volume conditions, respectively, of the variable-volume chamber 74. In this instance, the diaphragm 73 is assumed, for purposes of description, to be moved into the position providing the maximum-volume condition of the variable-volume chamber 74 in response to vacuum lower than a third predetermined level $P_3$ of minus 200 millimeters of mercury ($-200$ mmHg) and into the position providing the minimum-volume condition of the variable-volume chamber 74 in response to vacuum higher than a predetermined fourth level $P_4$ of minus 400 millimeters of mercury ($-400$ mmHg). Such performance characteristics of the second flow control valve unit 58 will be achieved by suitably selecting the measurements of the diaphragm 73 and/or the spring constant of the preload spring 78. The flow rate of the recirculated exhaust gases through the flow control chamber 81 of the second valve unit 58 is thus continuously controlled between zero and a maximum $F_2$ as the vacuum developed in the variable-volume chamber 74, viz., in the intake manifold 26 of the engine varies between the third and fourth predetermined levels $P_3$ and $P_4$ of the above specified values. FIG. 13 illustrates a flow characteristic curve $f_2$ which is achieved by the second flow control valve unit 58.

The above specified values of the first to fourth predetermined levels $P_1$ to $P_4$ of vacuum are merely by way of example and may be arbitrarily varied to achieve desired flow characteristics by the first and second flow control valve units 57 and 58. In this instance, however, it is preferable that the levels $P_1$ to $P_4$ be determined so that the levels $P_1$, $P_2$, $P_3$ and $P_4$ of vacuum are higher or, in other words, have absolute values which are larger in this sequence.

Figure 14:
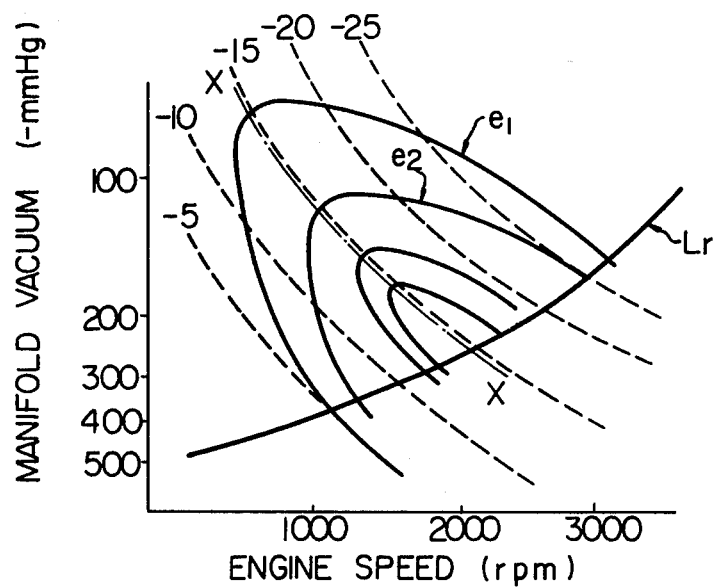
FIG. 14 is a graph showing isoplethic curves indicating the recirculated exhaust-gas ratio (to be defined later) in terms of the revolution speed of an internal combustion engine and the vacuum in the intake manifold of the engine as achieved when only one of the flow control valve units of the valve arrangements of FIG. 11 is in use.

If, now, the vacuum amplification factor achieved by the vacuum amplifier unit 59 is 1:10, the first flow control valve unit 57 is operative to pass the recirculated exhaust gases through the flow control chamber 70 at a rate which increases as the engine speed is increased from the idling condition and the vacuum in the venturi 53 is increased beyond $-5$ mmHg which corresponds to the previously mentioned first predetermined level $P_1$ of $-50$ mmHg, as will be seen from curve $f_1$ in FIG. 12. When the engine speed is further increased and the vacuum in the venturi 53 reaches $-15$ mmHg corresponding to the previously mentioned second predetermined level $P_2$ of $-150$ mmHg, the flow of the recirculated exhaust gases ceases increasing and is maintained at the maximum rate $F_1$ even though the venturi vacuum is increased beyond $-15$ mmHg. As the engine speed is thus increased and/or the vacuum in the intake manifold 26 is decreased, there also results an increase in the rate of air inducted together with the fuel into the combustion chamber of an engine cylinder. If, thus, the vacuum in the venturi 53 is increased beyond the level of $-15$ mmHg which is indicated by an isoplethic curve X—X in the graph of FIG. 14 and the recirculated exhaust gases are passed through the first flow control valve unit 57 at the fixed rate $F_1$ as above-mentioned, the previously defined recirculated exhaust-gas ratio would be diminished if the exhaust gases passed through the first flow control valve unit 57 are delivered directly to the engine cylinder. The exhaust gas recirculation characteristics achieved by the first flow control valve unit 57 are, therefore, represented by generally v-shaped isoplethic curves $e_1$, $e_2$, . . . for the recirculated exhaust-gas ratio in terms of the engine speed and the intake manifold vacuum as demonstrated in FIG. 14. In FIG. 14, curve Lr indicates the level-road running load characteristics of an internal combustion engine in terms of the engine speed and the intake manifold vacuum while curves in broken lines are isoplethic curves representative of different levels $-5$, $-10$, $-15$, $-20$ and $-25$ mmHg of venturi vacuum. If the recirculated exhaust-gas ratio is controlled on the basis of the flow characteristics achieved by the first flow control valve unit 57 alone, the recirculated exhaust-gas ratio would become maximum under low-speed and low-load operating conditions of the engine and would consequently impair the stability of operation of the engine during such conditions. This means that the recirculated exhaust-gas ratio could not be increased to a satisfactorily high level under those operating conditions of the engine in which the engine is frequently operated for acceleration and in which the air-fuel mixture is inducted at an increased rate into the engine cylinder and the combustion chamber is heated to elevated temperatures which are responsible for the production of nitrogen oxides. Furthermore, there would exist conditions in which the recirculated exhaust-gas ratio is increased when the engine is being operated for deceleration or when the vehicle is running down a hill with the engine operating at high speed with low load as indicated by the area below the level-road running load curve Lr. Under such conditions, the recirculated exhaust gases give rise to an undue decrease in the combustion temperature and thus result in an increase in the concentration of hydrocarbons and carbon monoxide in the exhaust gases emitted from the engine cylinders. The reduction in the combustion temperature is reflected by reduction in the temperature of the exhaust gases fed to the thermal reactor in the exhaust system and invites deterioration of the performance efficiency of the thermal reactor. The hydrocarbons and carbon monoxide thus fail to be completely processed in the thermal reactor and are allowed to be discharged into the atmosphere. All these problems can be avoided by provision of the second flow control valve unit 58 which is located in the exhaust gas recirculation passageway 34 downstream of the first flow control valve unit 57 and which is operative to re-adjust the exhaust gas recirculation rate on the basis of the vacuum developed in the intake manifold 26 of the engine.

Figure 15:
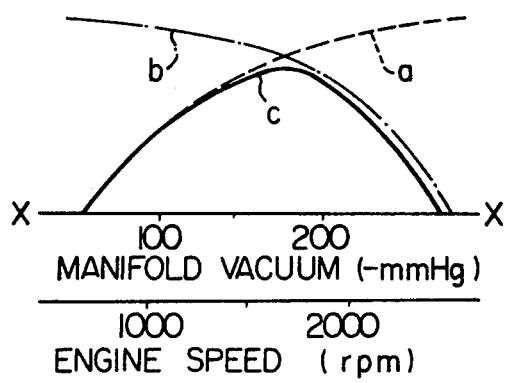
FIG. 15 is a graph showing the recirculated exhaust-gas ratio characteristics in terms of the intake manifold vacuum and the revolution speed of the engine as achieved when each of the flow control valve units of FIG. 11 is used independently (curves a and b) and when the valve units are used in combination (curve c)
Figure 16:
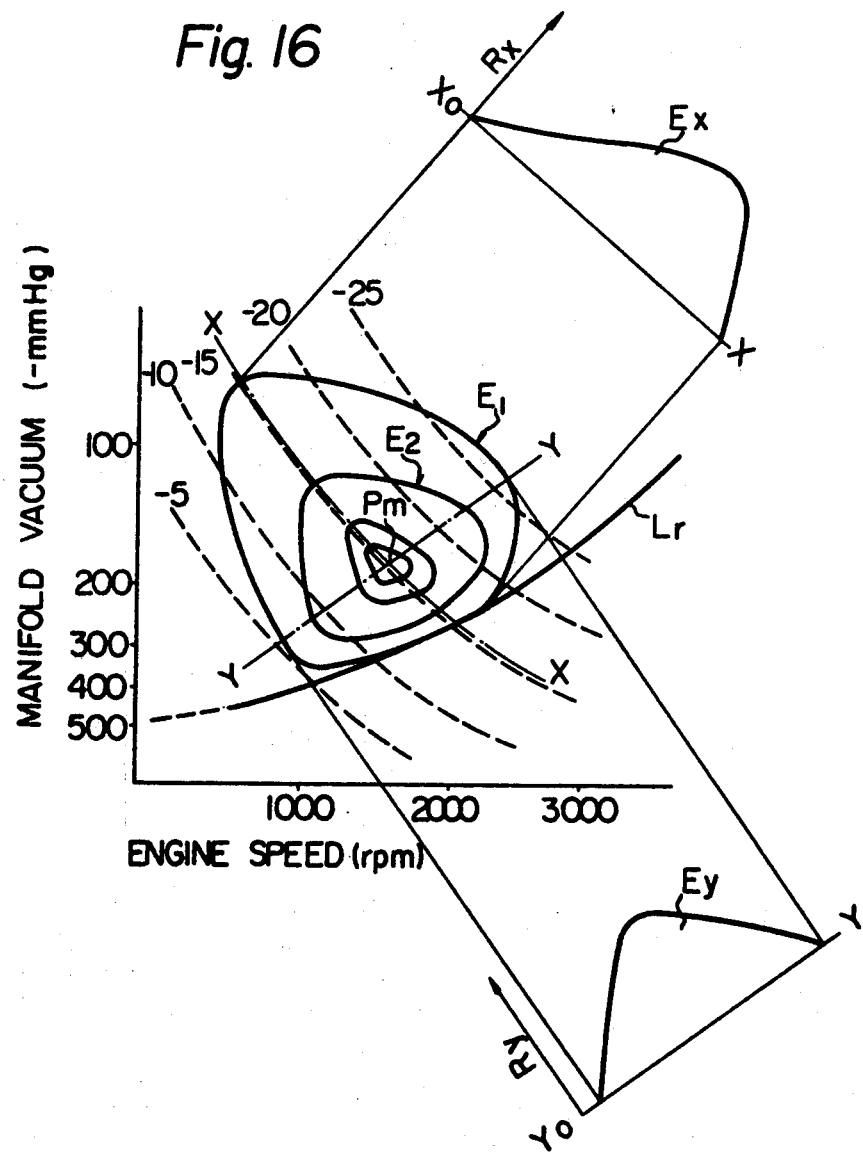
FIG. 16 is a graph similar to FIG. 14 but shows the recirculated exhaust gas ratio characteristics achieved by the flow control valve arrangement illustrated in FIG. 11.

While the first flow control valve unit 57 is adapted to produce an exhaust gas recirculation rate which is increased as the venturi vacuum increases within a predetermined range as hereinbefore described, the second flow control valve unit 58 is arranged to achieve an exhaust gas recirculation rate which is decreased as the intake manifold vacuum increases within the range between the previously mentioned third and fourth predetermined levels $P_3$ and $P_4$ of $-200$ mmHg and $-400$ mmHg, respectively, as indicated by the curve $f_2$ in FIG. 13. If, thus, the recirculated exhaust-gas ratio which are achieved independently by the first and second flow control valve units 57 and 58 are assumed to vary as indicated by curves $a$ and $b$, respectively, of FIG. 15 in terms of both the intake manifold vacuum in $-$mmHg and the engine revolution speed in rpm, the recirculated exhaust-gas ratio achieved by the combination of the two flow control valves 57 and 58 will be varied as indicated by curve $c$ in FIG. 15 with the result that the recirculated exhaust-gas ratio is varied in such a manner as can be indicated by closed-loop isoplethic curves in terms of the revolution speed of the engine and the intake manifold vacuum (which is the representation of the engine load) and peaks up at point Pm within a region in which the intake manifold vacuum falls within a range of between $-150$ mmHg and $-200$ mmHg and in addition the revolution speed of the engine falls within the range of between 1400 rpm and 2000 rpm, as will be seen from curves $E_1$, $E_2$, . . . or, more evidently from curves Ex and Ey of FIG. 16. The curve Ex indicates the variation of the recirculated exhaust-gas ratio Rx using as the abscissa $X_o$-X the isoplethic venturi vacuum curve X—X passing through the above-mentioned point Pm while the curve Ey indicates the variation of the recirculated exhaust-gas ratio Ry for different levels of venturi vacuum on line Y—Y passing through the point Pm and used as the abscissa Yo-Y.

With the respective flow characteristics of the first and second flow valves 57 and 58 thus combined together, the recirculated exhaust-gas ratio can be controlled in such a manner as to become maximum when the engine is being operated in normal steady-state conditions with the revolution speed varied within the range of 1400 to 2000 rpm and with the intake manifold vacuum varied within the range of −150 to −200 mmHg, the engine is permitted to operate stably under low-speed and low-load conditions.

Figure 17:
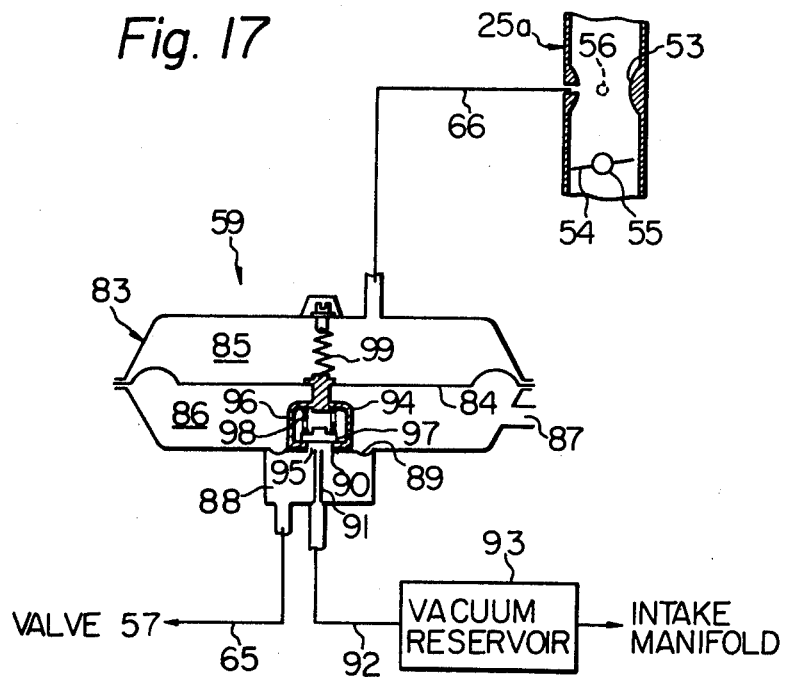
FIG. 17 is a schematic sectional view showing, partly in block form, a preferred example of a vacuum amplifier unit incorporated in the flow control valve arrangement of FIG. 11.

The vacuum amplifier unit 59 may be constructed and arranged in any desired manner, a preferred example thereof being illustrated in FIG. 17. Referring to FIG. 17, the vacuum amplifier unit 59 comprises a casing 83 which is internally divided by a diaphragm 84 into a vacuum-acting variable volume chamber 85 and an atmospheric chamber 86. The variable-volume chamber 85 is in constant communication with the venturi 53 in the mixture delivery pipe 25a of the carburetor through the previously mentioned passageway 66, while the atmospheric chamber 86 is open to the atmosphere through a vent 87. The casing 83 has further formed therein a control chamber 88 which is contiguous to the atmospheric chamber 86 across a diaphragm 89 formed with a central opening 90. The diaphragm 89 thus located between the atmospheric chamber 86 and the control chamber 88 has a vacuum acting area smaller than the vacuum acting area of the diaphragm 84 between the variable-volume and atmospheric chambers 85 and 86, the ratio between the vacuum acting areas of the diaphragms 84 and 89 being predetermined to provide a desired vacuum amplification factor. A vacuum nozzle 91 projects into the control chamber 88 and has its open leading end located in the vicinity the opening 90 in the diaphragm 89. The vacuum nozzle 91 is in constant communication through a passageway 92 with a vacuum reservoir 93. The vacuum reservoir 93 in turn is in communication with the intake manifold (not shown in FIG. 17) of the engine. The control chamber 88 is, furthermore, in constant communication with the vacuum-acting variable-volume chamber 62 of the first flow control valve unit 57 (FIG. 11) through the previously mentioned passageway 65. The diaphragms 84 and 89 are connected together by a generally cup-shaped connecting member 94 which is positioned within the atmospheric chamber 86 and which is formed with a central opening 95 adjacent the opening 90 in the diaphragm 89, the opening 95 being defined by an annular wall portion secured to the diaphragm 89. The connecting member 94 has further formed in its side wall portion one or more apertures 96 providing constant communication between the internal space in the connecting member 94 and the atmospheric chamber 86. Within the connecting member 94 thus configured are positioned a disc-shaped valve element 97 which is movable into and out of a position closing the opening 95 in the connecting member 94 and a preload spring 98 which is seated at one end on the valve element 97 for urging the valve element 97 toward the position closing the opening 95. The variable-volume chamber 85 is biased to contract and accordingly the connecting member 94 is urged toward the variable-volume chamber 85 by means of a preload spring 99 which is mounted within the variable-volume chamber 98 and anchored at one end on the diaphragm 84.

When the engine is operating at a relatively low speed and as a consequence the vacuum developed in the venturi 53 in the mixture delivery pipe 25a of the carburetor 25 is maintained at a relatively low level, the diaphragm 84 between the variable-volume and atmospheric chambers 85 and 86 is moved to expand the variable-volume chamber 85 and, as a consequence, the connecting member 94 and accordingly the diaphragm 89 between the atmospheric and control chambers 86 and 88 are moved toward the control chamber 88. The valve element 97 within the connecting member 94 is thus moved into contact with the vacuum nozzle 91 in the control chamber 88 and closes the open leading end of the nozzle 91, isolating the control chamber 88 and the vacuum reservoir 93. If, under these conditions, the connecting member 94 and the diaphragm 89 between the atmospheric and control chambers 86 and 88 are moved into such positions as to have the annular wall portion of the connecting member 94 spaced apart from the valve element 97 which is being pressed against the leading end of the vacuum nozzle 91 by the preload spring 98, an annular gap is formed between the valve element 97 and the inner face of the annular wall portion of the connecting member 94 though not shown in the drawing so that communication is provided between the atmospheric chamber 86 and the control chamber 88 through the gap and the aperture or apertures 96 in the side wall portion of the connecting member 94. Atmospheric air is thus allowed to pass from the atmospheric chamber 86 into the control chamber 88 and is drawn through the passageway 65 into the variable-volume chamber 62. The vacuum in the variable-volume chamber 62 of the valve unit 57 is thus reduced as the vacuum in the venturi 53 of the mixture delivery pipe 25a of the carburetor decreases. As the engine speed is increased and accordingly the vacuum in the venturi 25a increases, the variable-volume chamber 85 is caused to contract so that the diaphragm 84 between the variable-volume and atmospheric chambers 85 and 86 is moved toward the variable-volume chamber 85. The connecting member 94 is moved with the diaphragm 84 and the valve element 97, which is therefore spaced apart from the vacuum nozzle 91 and allows the nozzle 91 to open into the control chamber 88. Because, under these conditions, the valve element 97 is forced against the inner face of the annular wall portion of the connecting member 94 by the preload spring 98 and thus closes the opening 95 defined by the annular wall portion, the control chamber 88 is isolated from the internal space in the connecting member 94 and accordingly the atmospheric chamber 86 so that the intake manifold vacuum in the vacuum reservoir 93 is allowed to extend by way of the passageway 92, vacuum nozzle 91, control chamber 88 and passageway 65 into the variable-volume chamber 62 of the first flow control valve unit 57 shown in FIG. 11. When the intake manifold vacuum is thus developed in the control chamber 88, the diaphragm 89 between the atmospheric and control chambers 86 and 88 is urged toward the control chamber 88. If, under these conditions, the sum of the force of the preload spring 99 and the force resulting from the venturi vacuum acting on the diaphragm 84 from the variable-volume chamber 85 is overcome by the force resulting from the intake manifold vacuum acting on the diaphragm 89 from the control chamber 88, the diaphragms 84 and 89 and the connecting member 94 are moved toward the control chamber 88 with the result that the valve element 97 moved with the connecting member 94 is for a second time brought into contact with the vacuum nozzle 91 and closes the open leading end of the nozzle 91, thereby isolating the control chamber 88 and the vacuum reservoir 93. The vacuum in the control chamber 88 and accordingly in the variable-volume chamber 62 of the first flow control valve unit 57 (FIG. 11) is thus regulated to be constantly proportional to the vacuum in the venturi 53 of the mixture delivery pipe 25a of the carburetor. The vacuum amplifier unit 59 is, in this fashion, operative to deliver vacuum which is an amplified reproduction of the venturi vacuum with a ratio or amplification factor dictated by the ratio between the vacuum acting area of the diaphragm 84 responsive to the venturi vacuum and the vacuum acting area of the diaphragm 89 responsive to the intake manifold vacuum.

FIG. 18 illustrates a modification of the exhaust gas flow control valve means of FIG. 11. While two flow control valves 57 and 58 having different flow characteristics are used in combination in the valve arrangement of FIG. 11 for achieving the closed-loop characteristics of the recirculated exhaust-gas ratio, such characteristics of the recirculated exhaust-gas ratio are achieved in the valve arrangement of FIG. 18 by the combination of a vacuum operated flow control valve 57' which is essentially similar to the first flow control valve 57 of the valve arrangement of FIG. 11, a vacuum amplifier unit 50' which is, in itself, essentially similar to the vacuum amplifier unit 59 illustrated in FIG. 17, and a vacuum modulator unit 100 which is provided in conjunction with the vacuum amplifier unit 59. The vacuum modulator unit 100 is adapted to vary the vacuum to be developed in the control chamber 88 of the vacuum amplifier unit 59 in response to variation in a suitable operational parameter representative of the revolution speed of the engine such as, for example, the suction which is developed in a restriction 101 formed in an oil feed passageway 102 leading to the suction port (not shown) of an engine-driven oil pump 103 forming part of the lubricating system of the engine. The vacuum modulator unit 100 comprises a casing 104 which is securely mounted on that wall portion of the casing 83 of the vacuum amplifier unit 59 which defines part of the variable-volume chamber 85 of the amplifier unit. The casing 104 is internally divided by a flexible diaphragm 105 into two separate variable-volume chambers which consist of a suction chamber 106 and an atmospheric chamber 107. The suction chamber 106 is in constant communication with the above-mentioned restriction 101 in the oil feed passageway 102 of the engine lubricating system through a passageway 108, while the atmospheric chamber 107 is open to the atmosphere through an air vent 109 formed in the casing 104. The atmospheric chamber 107 is located adjacent to the variable-volume chamber 85 of the vacuum amplifier unit 59 as shown. The diaphragm 105 is biased in a direction to expand the suction chamber 106 by means of a preload spring 110 which is positioned within the suction chamber 106 and which is seated at one end on a generally cup-shaped spring seat element 111 attached to one face of the diaphragm 105. The diaphragm 105 is movable or deformable substantially parallel with the direction of movement or deformation of the diaphragm 84 of the vacuum amplifier unit 59 and is thus biased by the preload spring 110 toward the diaphragm 84 of the amplifier unit 59.

The diaphragm 105 has secured to the other face thereof an actuating rod 112 which extends out of the atmospheric chamber 107 into the variable-volume chamber 85 of the vacuum amplifier unit 59 through an opening 113 which is formed in that wall portion of the casing 83 of the vacuum amplifier unit which defines part of the variable-volume chamber 85. The opening 113 is hermetically sealed off by suitable sealing means (not shown) secured to the casing 83. The actuating rod 112 is axially movable with the diaphragm 105 of the vacuum modulator unit 100 in a direction parallel with the direction of movement or deformation of the diaphragm 84 of the vacuum amplifier unit 59. A bracket 114 is securely mounted on the internal face of that wall portion of the casing 83 of the vacuum amplifier unit 59 which is located in the vicinity of the operating 113 and projects into the variable-volume chamber 85 of the vacuum amplifier unit 59 substantially in parallel with the projecting end portion of the actuating rod 112. A control lever 115 is rotatably mounted on the bracket 114 by a pivotal pin 116 and is pivotally connected at one end to the projecting end portion of the actuating rod 112 by a pivotal pin 117. The control lever 115 is engageable at the other end thereof with the diaphragm 84 of the vacuum amplifier unit 59 depending upon the relative positions of the actuating rod 112 and the control lever 115 so that the diaphragm 84 is moved in the direction to expand the variable-volume chamber 85 of the vacuum amplifier unit 59 when the actuating rod 112 is axially moved away from the diaphragm 84 and thus causes the control lever 115 to turn clockwise of the drawing about the pivotal pin 116.

When, in operation, the engine is operating at a relatively low speed and accordingly the suction developed in the restriction 101 in the oil feed passageway 102 of the engine lubricating system is maintained at a relatively low level, the suction chamber 106 of the vacuum modulator unit 100 is allowed to expand by the force of the preload spring 110 so that the actuating rod 112 extending from the diaphragm 105 projects deep into the variable-volume chamber 85 of the vacuum amplifier unit 59. The control lever 115 is therefore turned counterclockwise of the drawing about the pivotal pin 116 and is held in an angular position having its free end disengaged from the diaphragm 84 of the vacuum amplifier unit 59. Under these conditions, the vacuum amplifier unit 59 is allowed to operate independently of the vacuum modulator unit 100 so that the vacuum developed in the control chamber 88 of the vacuum amplifier unit 59 and, accordingly, the flow rate of the exhaust gases recirculated into the intake manifold 26 through the flow control chamber 70 of the valve 57 is varied independently of the suction developed on the suction side of the engine-driven oil pump 103, viz., in accordance with the flow characteristics indicated by the curve $f_1$ in the graph of FIG. 12.

As the revolution speed of the engine is increased and accordingly the suction in the restriction 101 in the oil feed passageway 102 rises, the suction chamber 106 of the vacuum modulator unit 100 is caused to contract against the opposing force of the preload spring 110 so that the actuating rod 112 is axially moved away from the diaphragm 84 of the vacuum amplifier unit 59. This causes the control lever 115 to turn clockwise of the drawing about the pivotal pin 116 into an angular position having its free end in contact with the diaphragm 84. As the engine revolution speed and accordingly the suction developed on the suction side of the oil pump 103 are further increased, the control lever 115 is further turned clockwise of the drawing about the pivotal pin 116 and, thus, presses the diaphragm 84 of the vacuum amplifier unit 59. The force resulting from the venturi vacuum acting on the diaphragm 84 is thus opposed by the force of the control lever 115 in pressing engagement with the diaphragm 84. Under these conditions, the diaphragm 84 is moved into the position closing the open end of the vacuum nozzle 91 by the valve element 97 in response to venturi vacuum of reduced level. The vacuum developed in the control chamber 88 of the vacuum amplifier unit 59 and accordingly in the variable-volume chamber 62 of the flow control valve 57 is thus made the lower and accordingly the flow rate of the exhaust gases to be recirculated into the intake manifold through the flow control chamber 70 of the valve 57 is made the lower as the revolution speed of the engine becomes higher.

The above described exhaust gas recirculation system is thus adapted to recirculate the exhaust gases into the mixture supply system of the engine at a rate providing a recirculated exhaust-gas ratio which is varied in accordance with such characteristics as are indicated by closed-loop isoplethic curves in terms of the revolution speed and load of the engine and which peaks up during normal steady-state operating conditions of the engine when the performance characteristics of the flow control valve 57 and the vacuum modulator unit 100 are properly determined, similarly to the arrangement of FIG. 11.

The arrangements hereinbefore described with reference to FIGS. 2 and 18 are all adapted to reduce nitrogen oxides in the exhaust gases from engine cylinders basically by increasing the proportion of the quantities of inactive compounds in the mixture gases produced in the cylinders. Dilution of the mixture gases results in reduction of the combustion efficiency in the engine cylinders and accordingly in an increase in the concentration of hydrocarbons and carbon monoxide in the exhaust gases emitted from the cylinders. The present invention proposes to solve this problem by maintaining the exhaust gases at sufficiently high temperature until the exhaust gases are passed over to the thermal reactor or other exhaust re-combusting means provided in the exhaust system.

Figure 19:
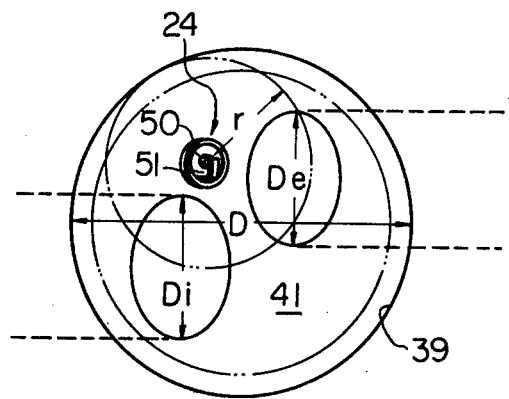
FIG. 19 is a schematic plan view of the configuration of a combustion chamber in an internal combustion engine embodying the present invention.

Turning back to FIG. 1, such a purpose is achieved by adoption of the previously described siamesed port arrangement for the exhaust ports 23a, 23b, 23c and 23d wherein one pair of neighboring exhaust ports 23a and 23b shares one branch pipe portion 27a of the exhaust manifold 27 and the other pair of neighboring exhaust ports 23c and 23d shares the other branch pipe portion 27b of the exhaust manifold 27. With the exhaust ports 23a to 23d thus arranged, the exhaust ports 23a to 23d have reduced surface areas which result in reduction in the quantity of heat released from the exhaust ports 23a to 23d into the cylinder head. The hot exhaust gases being passed through the branch pipe portions 27a of the exhaust manifold 27 are therefore maintained at sufficiently high temperatures until they reach the thermal reactor 29 and can be re-combusted in the thermal reactor 29 with a sufficiently high combustion efficiency. The unburned hydrocarbons and carbon monoxide initially contained in the exhaust gases are thus eliminated to a desired extent when the exhaust gases are discharged from the thermal reactor 29. The above described effect will be further enhanced if the exhaust port is provided with a heat-resistive lining 118 as illustrated in each of FIGS. 2, 3 and 4. Furthermore, experiments conducted the inventors have revealed that the loss of heat from the exhaust gases is reduced to a minimum when the exhaust port 23 is so sized as to have at its inlet end a diameter De of about 0.40 to 0.50 times the diameter D of the cylinder bore 39, as illustrated in FIG. 19. In this instance, the pumping loss of the engine cylinder is minimized when the intake port 22 is sized to have at its outlet end a diameter Di of about 0.45 to 0.55 times the diameter D of the cylinder bore 39 as is also illustrated in FIG. 19.

What is claimed is:

1. A multiple-cylinder spark-ignition internal combustion engine comprising exhaust-gas cleaning means in the exhaust system; mixture control means by which the ratio of the weight of inactive compounds in the mixture gases produced in the combustion chamber of each of the engine cylinders during each cycle of operation of the cylinder to the weight of the fuel component in the air-fuel mixture inducted into the combustion chamber is maintained within a range between about 13.15:1 and about 22.5:1, each of said engine cylinders having a bore diameter less than 95 millimeters and a bore volume less than 600 millimeters and effective to provide a compression ratio within the range between about 8.0:1 and about 10.5:1, said mixture control means including an exhaust gas recirculation system operative to recirculate the exhaust gases from the exhaust system into the intake manifold of the engine at a rate providing a recirculated exhaust gas ratio which is varied in accordance with such characteristics as are indicated by closed-loop isoplethic curves in terms of the revolution speed and load of the engine and which peaks up during normal steady-state operating conditions of the engine; and an ignition system which includes in the combustion chamber in each of the engine cylinders, a spark plug having a firing point which is located at a distance within a range between about 2 millimeters and 7 millimeters from the internal surface of a wall portion of a combustion chamber in which the spark plug is mounted, said spark plug being disposed so that the volume of the space enclosed within a spherical envelope having a radius $r$ in the combustion chamber about the firing point of said spark plug occupies at least 35 percent of the clearance volume of the combustion chamber, wherein said radius $r$ is given, when measured in meters, by the relation $r = (\theta \cdot Vc)/(6N)$ where $\theta$ is the degree of spark advance in terms of crankshaft rotation angle before the top dead center, Vc is the combustion rate in meters per second of the combustible charge in the combustion chamber and N is the revolution speed in rpm of the engine within a predetermined range.

2. In a multiple-cylinder spark-ignition internal combustion engine including exhaust-gas recirculating means for partially recirculating exhaust gases from the exhaust system into the intake manifold of the engine, exhaust-gas cleaning means in the exhaust system and an ignition system which includes, in the combustion chamber in each of the engine cylinders, a spark plug having a firing point which is located at a distance within range between about 2 millimeters and 7 millimeters from the internal surface of a wall portion of a combustion chamber in which the spark plug is mounted, said spark plug being disposed so that the volume of the space enclosed within a spherical envelope having a radius $r$ in the combustion chamber about the firing point of said spark plug occupies at least 35 percent of the clearance volume of the combustion chamber, wherein said radius $r$ is given, when measured in meters, by the relation $r = (\theta \cdot Vc)/(6N)$ where $\theta$ is the degree of spark advance in terms of crankshaft rotation angle before the top dead center, Vc is the combustion rate in meters per second of the combustible charge in the combustion chamber and N is the revolution speed in rpm of the engine within a predetermined range, each of said engine cylinders having a bore diameter less than 95 millimeters and a bore volume less than 600 millimeters and effective to provide a compression ratio within the range between about 8.0:1 and about 10.5:1, a method of reducing the concentrations of toxic compounds in the exhaust gases to be emitted from the engine, comprising maintaining within the range between about 13.5:1 and about 22.5:1 the ratio of the weight of inactive compounds in the mixture gases produced in the combustion chamber of each of the engine cylinders during each cycle of operation of the cylinder to the weight of the fuel component in the air-fuel mixture inducted into the combustion chamber, said ratio being maintained within said range by controlling the exhaust gas recirculation rate for providing a recirculated exhaust gas ratio which is varied in accordance with each characteristics as are indicated by closed-loop isoplethic curves in terms of the revolution speed and load of the engine and which peaks up during normal steady-state operating condition of the engine, and controlling the portion of the residual exhaust gases in the combustion chamber during each cycle of operation of the cylinder.

3. An internal combustion engine as set forth in claim 1, in which said exhaust gas recirculation system comprises a vacuum amplifier unit operative to amplify the vacuum in the venturi in the mixture supply system of the engine in a predetermined ratio, means defining an exhaust gas recirculation passageway for providing communication between the exhaust system and the mixture supply system of the engine, a flow control valve provided in said exhaust gas recirculation passageway and responsive to the amplified venturi vacuum developed by said vacuum amplifier unit for passing the exhaust gases through the passageway at a rate which varies within a predetermined range substantially in proportion to the amplified venturi vacuum within a predetermined range, and a vacuum modulator unit responsive to variation in the revolution speed of the engine and operatively connected to said vacuum amplifier unit for reducing the amplified venturi vacuum substantially in proportion to an increase in the engine revolution speed higher than a predetermined level.

4. An internal combustion engine as set forth in claim 3, in which said flow control valve comprises a variable-volume chamber in constant communication with said vacuum amplifier unit and a flexible diaphragm separating it from the atmosphere, a flow control chamber in said exhaust gas recirculation passageway, a valve element connected at one end to said diaphragm and forwardly tapered toward the other end, the tapered end of the valve element projecting into said flow control chamber so that the flow control chamber is continuously increased within said predetermined range thereof as the valve element is axially moved with said diaphragm moved in a direction to expand said variable-volume chamber, and biasing means urging the diaphragm in said direction to expand the variable-volume chamber, said variable-volume chamber being urged to contract against the force of said biasing means by the amplified venturi vacuum developed in the variable-volume chamber.

5. An internal combustion engine as set forth in claim 4, in which said vacuum amplifier unit comprises a vacuum chamber which is in constant communication with venturi in the mixture supply system, an atmospheric chamber isolated from said vacuum chamber by a first diaphragm and constantly open to the atmopshere, a control chamber separated from the atmospheric chamber by a second diaphragm and in constant communication with the variable-volume chamber of said flow control valve, the second diaphragm having a pressure acting area smaller by a predetermined ratio than the pressure acting area of the first diaphragm and having an opening for providing communication between the atmospheric chamber and the control chamber, a nozzle projecting into said control chamber and having an open end located in the vicinity of said opening in the second diaphragm, said nozzle being in communication with the intake manifold of the mixture supply system, a connecting member located within said atmospheric chamber and connecting said first and second diaphragms, the connecting member having a seat portion secured to the second diaphragm and having an opening contiguous with the opening in the second diaphragm, a valve element movable into and out of contact with the seat portion of the connecting member for providing communication between the atmospheric and control chambers through the openings in the second diaphragm and the seat portion when unseated from the seat portion, first biasing means urging the first diaphragm in a direction to contract said vacuum chamber against the amplified venturi vacuum developed in the control chamber, and second biasing means urging said valve element in a direction to be seated on said seat portion of the connecting member for closing the openings in the seat portion and the second diaphragm and thereby isolating the atmospheric and control chambers from each other, the valve element being further movable into and out of a position closing the open end of said nozzle for isolating said control chamber from the intake manifold depending upon the positions of the first and second diaphragms and the connecting member relative to said nozzle.

6. An internal combustion engine as set forth in claim 5, in which said vacuum modulator unit comprises a source of suction varying with the revolution speed of the engine, a variable-volume suction chamber isolated from the atmosphere by a flexible diaphragm and in constant communication with said source of suction for being urged to contract by the suction developed therein, biasing means for urging said suction chamber to expand against the force of suction developed therein, and a mechanical linkage connected at one end to said diaphragm and movably projecting into the vacuum chamber of said vacuum amplifier unit, said mechanical linkage being engageable at the other end thereof with said first diaphragm so that the mechanical linkage is held in engagement with said first diaphragm when the suction developed in said suction chamber is higher than a predetermined level, said first diaphragm being moved in a direction to expand said vacuum chamber for moving said valve element into said position closing the open end of said nozzle as the suction in said suction chamber is increased beyond said predetermined level.

7. An internal combustion engine as set forth in claim 6, in which said mechanical linkage comprises an actuating rod connected at one end to said diaphragm of the vacuum modulator unit and axially projecting into said vacuum chamber of the vacuum amplifier unit in a direction to move away from said first diaphragm as said suction chamber is contracted in response to an increase in the suction developed in the suction chamber, and a control lever mounted within said vacuum chamber and rotatable about a fixed axis, said control lever being pivotally connected at one end to the projecting end of said actuating rod and engageable at the other end with said first diaphragm of the vacuum modulator unit.

8. An internal combustion engine as set forth in claim 6, in which said source of suction is constituted by a restriction formed in the oil feed passageway leading to the suction port of the engine-driven oil pump of the lubricating system of the engine.

* * * * *